United States Patent
Yamada

(10) Patent No.: US 7,231,092 B2
(45) Date of Patent: Jun. 12, 2007

(54) IMAGE COMPRESSION/DECOMPRESSION SYSTEM EMPLOYING PIXEL THINNING-OUT AND INTERPOLATION SCHEME

(75) Inventor: Maiko Yamada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/313,810

(22) Filed: Dec. 22, 2005

(65) Prior Publication Data

US 2006/0098883 A1 May 11, 2006

Related U.S. Application Data

(62) Division of application No. 10/015,688, filed on Dec. 17, 2001, now Pat. No. 7,006,695.

(30) Foreign Application Priority Data

Dec. 27, 2000 (JP) ............................. 2000-396434
Mar. 28, 2001 (JP) ............................. 2001-091594

(51) Int. Cl.
*G06K 9/36* (2006.01)
(52) U.S. Cl. ................................... 382/239
(58) Field of Classification Search ............... 382/232, 382/233, 254, 258, 259, 266; 348/392.1, 348/424.1; 375/240.21, 240.24, 240.25
See application file for complete search history.

(56) References Cited

U.S. PATENT DOCUMENTS

| | | | | |
|---|---|---|---|---|
| 4,755,878 | A | | 7/1988 | Nakayama et al. |
| 4,802,003 | A | | 1/1989 | Takei et al. |
| 4,809,350 | A | * | 2/1989 | Shimoni et al. ............ 382/238 |
| 4,947,249 | A | | 8/1990 | Kondo |
| 4,947,448 | A | | 8/1990 | Nakayama et al. |
| 5,043,811 | A | | 8/1991 | Yasuhiro |
| 5,047,849 | A | * | 9/1991 | Hara .......................... 348/383 |
| 5,067,010 | A | | 11/1991 | Ishii et al. |
| 5,134,667 | A | * | 7/1992 | Suzuki ....................... 382/164 |
| 5,196,932 | A | | 3/1993 | Hoshi |
| 5,222,159 | A | * | 6/1993 | Kawamura et al. ......... 382/283 |
| 5,282,256 | A | * | 1/1994 | Ohsawa et al. ............. 382/252 |
| 5,504,530 | A | * | 4/1996 | Obikane et al. ....... 375/240.14 |
| 5,517,245 | A | * | 5/1996 | Kondo et al. ............ 348/392.1 |
| 5,517,588 | A | * | 5/1996 | Kondo ........................ 382/300 |

FOREIGN PATENT DOCUMENTS

JP            7-221993         8/1995

* cited by examiner

*Primary Examiner*—Jose L. Couso
(74) *Attorney, Agent, or Firm*—Dickstein Shapiro LLP

(57) ABSTRACT

An improved image thinning-out processing scheme includes processes of performing pixel thinning-out operation and compressing image data; and determining a position of pixel to be thinned out along a first direction depending on the position thereof along a second direction perpendicular to the first direction.

4 Claims, 22 Drawing Sheets

FIG.18
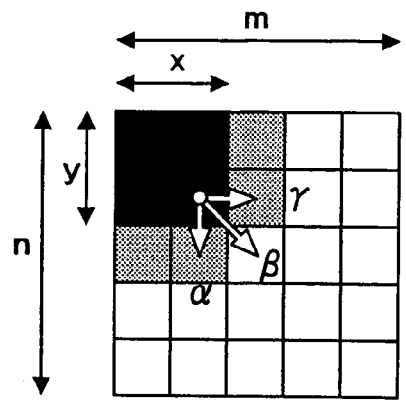
FIG.19
(image with numbered grid)
FIG.20
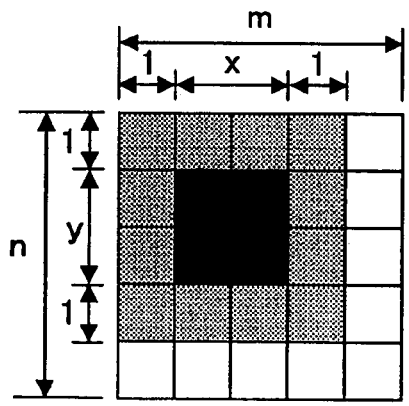

IMAGE COMPRESSION/DECOMPRESSION SYSTEM EMPLOYING PIXEL THINNING-OUT AND INTERPOLATION SCHEME

The present application is a divisional of application Ser. No. 10/015,688, filed Dec. 17, 2001, now U.S. Pat. No. 7,006,695 the entire disclosure of which is incorporated herein by reference.

BACKGROUND OF THE INVENTION

1. Field of the Invention

The present invention generally relates to an image compression/decompression system, in particular, to an image compression/decompression system employing efficient pixel thinning-out and interpolation schemes.

An image compression/decompression system according to the present invention may be applied widely to various image processing application programs, various device drivers (software) such as printer drivers, also, to various image processing apparatus/equipment processing color images.

2. Description of the Related Art

With regard to image compression/decompression techniques, various schemes have been proposed. For example, Japanese laid-open patent application No. 7-221993 discloses a color image data thinning-out method, and a color image data compression method. In the methods, according to change rates in U data and V data representing color components, a size of pixel zone to be thinned out for each image block is controlled. Specifically, as the change rate is larger, the size of pixel zone to be thinned out is to be reduced. On the other hand, as the change rate is smaller, the size of pixel zone to be thinned out is to be enlarged. Thereby, an edge line of an image is prevented from being lost due to thinning-out processing.

Thus, by utilizing a characteristic of human eyes, a thinning-out rate is appropriately selected for a color component according to a color change rate for each image block such as that including 8×8 pixels, 16×16 pixels or the like. Thereby, effective image compression without remarkable apparent degradation in image quality may be attained.

However, according to the above-described methods disclosed by Japanese laid-open patent application No. 7-221993, a considerable time may be required for calculating change rates in U data and V data for each image block.

Furthermore, generally speaking, a natural image is likely to include a lot of thin lines/edge lines extending horizontally or vertically while a few of those extending obliquely. Therefore, when simply pixels arranged vertically are thinned out as disclosed by the above-mentioned patent publication as shown in FIG. 1, a lot of thin lines, edge lines and so forth included in a natural image may be completely lost during image data compressing processing.

SUMMARY OF THE INVENTION

An object of the present invention is to solve the above-mentioned problem, and, to provide an image compression/decompression schemes having a pixel thinning-out/interpolation schemes, by which, efficient image data compression/decompression can be attained by an effectively reduced data processing time, reduced data processing resources, but without remarkable apparent degradation in image quality during image data compression/decompression processing.

For this purpose, according to the present invention, as shown in FIG. 2, pixels to be thinned out are determined to be those arranged obliquely or in a staggering manner, not straightly vertically or horizontally. Thereby, it is possible to prevent a lot of thin lines, edge lines and so forth extending horizontally or vertically included in a natural image from being lost through image data compressing processing.

Furthermore, by selecting pixels to be thinned out as shown in FIG. 4 in a staggering manner, in comparison to a case shown in FIG. 3, distances between adjacent ones of the pixels to be thinned out become effectively elongated. Thereby, it is possible that, even when vertically extending thin lines included in a natural image are lost partially by the thinning-out processing, this may not result in remarkable apparent degradation of image quality.

In order to achieve such thinning-out processing obliquely or in a staggering manner, a position of a pixel to be thinned out for each image block is determined, according to a predetermined rule, in such a manner that the pixels thinned out are prevented from becoming adjacent to each other between image blocks adjacent to each other vertically and horizontally. Thereby, it is possible to achieve thinning-out processing obliquely or in a staggering manner by a simple configuration either on a device (LSI or the like) or on a software program.

An image compressing scheme according to the present invention comprising:

performing pixel thinning-out operation and compressing image data; and determining a position of pixel to be thinned out along a first direction depending on the position thereof along a second direction perpendicular to the first direction.

Thereby, it is possible to prevent thin lines/edge lines included in an original image from being lost remarkably apparently while higher-rate data compressing can be attained with a relatively simple configuration.

In the above-mentioned scheme, the position of pixel to be thinned out may comprise a position with respect to each predetermined unit area of the relevant image including a predetermined number of pixels.

Thus, by performing image data compression processing for each unit area of the relevant original image, it is possible to attain high speed compression processing.

In the scheme, the positions of pixels to be thinned out along the first direction may be determined along the second direction such that the positions of pixels to be thinned out do not align with one another between each pair of unit areas adjacent to one another along the second direction.

Control operation performing such a manner of processing may be easily attained by configuring such that the positions of the thinned-out pixels with respect to the respective unit areas may be changed alternately every line of unit areas according to a simple rule, as shown in FIGS. 6A, 6B, 7, 8 and 9. Thus, the positions of the thinned-out pixels are located not continuos but intermittently, and, thus, it is possible to effectively prevent thin lines/edge lines included in an original image from being lost continuously. Thus, a high image quality may be maintained even through image data compressing and decompressing processes.

An image decompressing scheme according to the present invention comprises:

interpolating/generating thinned-out pixels; and determining pixels to be used for the interpolation, wherein pixels nearest to the thinned-out pixels may be selected for the interpolation.

Thereby, high speed image decompressing processing may be attained while a high image quality may be maintained through image data compressing and decompressing processes.

In the scheme, pixels not included in an original pixel block in which thinned-out pixels are included may be applied for interpolation/generation of the thinned-out pixels.

Thereby, it is possible to utilize pixels of various pixel blocks (located in various directions, particularly, vertical and horizontal directions) for interpolation. Accordingly, thin lines/edge lines extending in various directions included in an original image may be effectively prevented from being lost during image data compressing/decompressing processing.

The pixel to be used for interpolation may be determined such that pixels adjacent to an original pixel block (rectangular block) via short sides thereof may be applied.

Thereby, it is possible to utilize pixels of various pixel blocks (located in various directions, particularly, vertical and horizontal directions) for interpolation. Accordingly, thin lines/edge lines extending in various directions included in an original image may be effectively prevented from being lost during image data compressing/decompressing processing.

Another image decompressing scheme according to the present invention comprises:

performing interpolation of thinned-out pixels; and determining a method of interpolation according to a pixel-number changing rate of pixel-number changing processing performed after the interpolation such that a finer interpolation method be selected as the pixel-number changing rate at which the number of pixels is increased becomes larger.

Thereby, high speed decompressing processing may be attained, while a high image quality may be maintained during image data compressing/decompressing processing.

In the scheme, a nearest pixel method (described later) may be applied when the pixel-number changing rate is less than a first threshold, a linear interpolation method (well-known) is applied when the pixel-number changing rate falls within a range between the first threshold and a second threshold, and a three-order interpolation method (described later) is applied when the pixel-number changing rate is more than the second threshold.

Thereby, it is possible to appropriately select an interpolation method according to a size of image to be output after interpolation/decompression. In case merely a small image should be displayed as an output image, a less finer interpolation method may be applied so that a time required for performing image data decompression/interpolation may be effectively reduced. In contrast thereto, in case a relatively large image should be displayed, a finer interpolation method may be applied so that remarkable image degradation through image data compression which is likely to be apparent in such a case may be effectively prevented.

Another image decompressing scheme according to the present invention comprises:

interpolating thinned-out pixels from not-thinned-out pixels; and determining an interpolating method applied, so that a less finer interpolation method may be applied for thinned-out pixels located nearer to the not-thinned-out pixels used for the interpolation.

Thereby, high speed decompressing processing may be attained, while a high image quality may be maintained during image data compressing/decompressing processing.

In the scheme, a plurality of interpolation methods may be selectively applied for a single image and the interpolation method to be applied may be determined according to the center-to-center pixel distances from the not-thinned-out pixels.

Thereby, high speed decompressing processing may be attained, while a high image quality may be maintained during image data compressing/decompressing processing.

The nearest pixel method may be applied for thinned-out pixels most nearest to the not-thinned-out pixels used for interpolation, and at least one of the linear interpolation method and third-order interpolation method may be applied for the other thinned-out pixels.

BRIEF DESCRIPTION OF THE DRAWINGS

Other objects and further features of the present invention will become more apparent from the following detailed description when read in conjunction with the following accompanying drawings:

FIGS. 16 and 17 illustrate specific interpolation processing examples according to the fifth embodiment of the present invention;

FIG. 18 illustrates a basic image data interpolation pattern according to a sixth embodiment of the present invention;

FIG. 19 illustrates a specific interpolation processing examples according to the sixth embodiment of the present invention;

FIG. 20 illustrates a basic image data interpolation pattern according to a seventh embodiment of the present invention;

DESCRIPTION OF THE PREFERRED EMBODIMENTS

Figure 1:
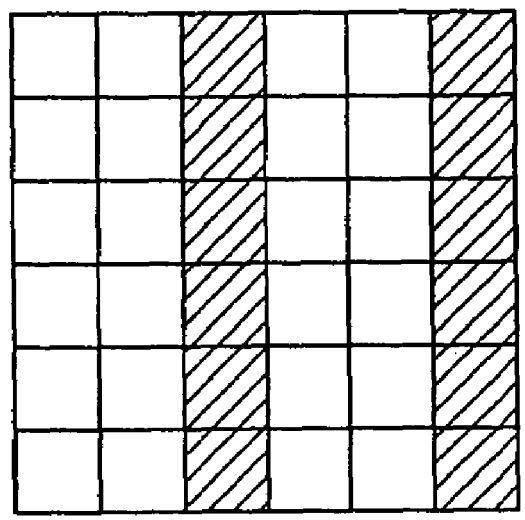
FIG. 1 illustrates a state of image data thinning-out processing scheme in the related art.
Figure 2:
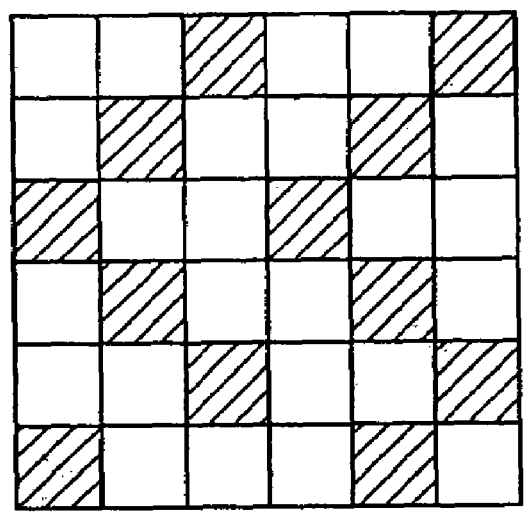
FIGS. 2, 3 and 4 illustrate basic concepts of image data thinning-out processing schemes according to the present invention.
Figure 3:
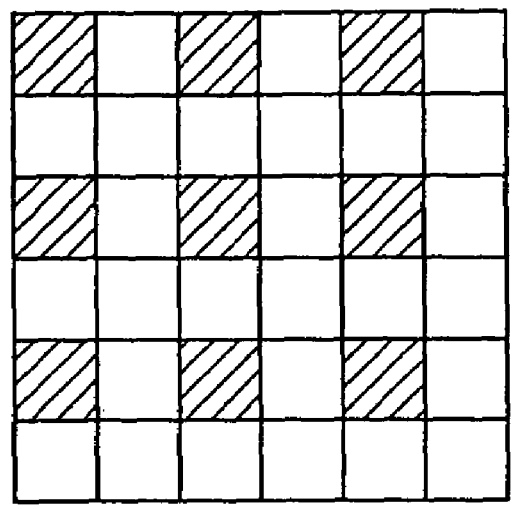
Figure 4:
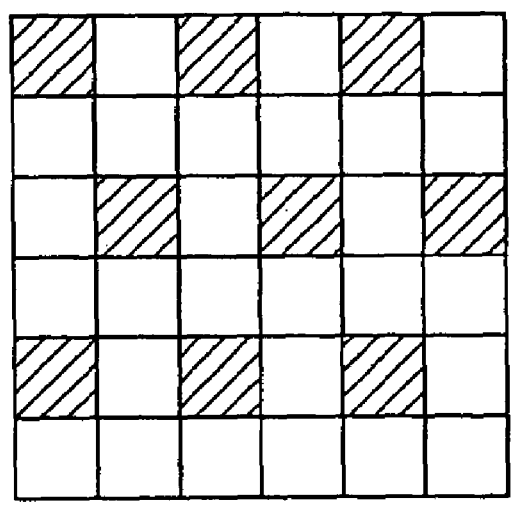

Referring to the drawings, an image compressing/decompressing apparatus which realizes an image compressing/decompressing method according to the present invention will now be described. In addition, this image compressing/decompressing method is realizable also on an information recording medium storing a software program which is executed by a general-purpose computer as will be described.

Figure 5:
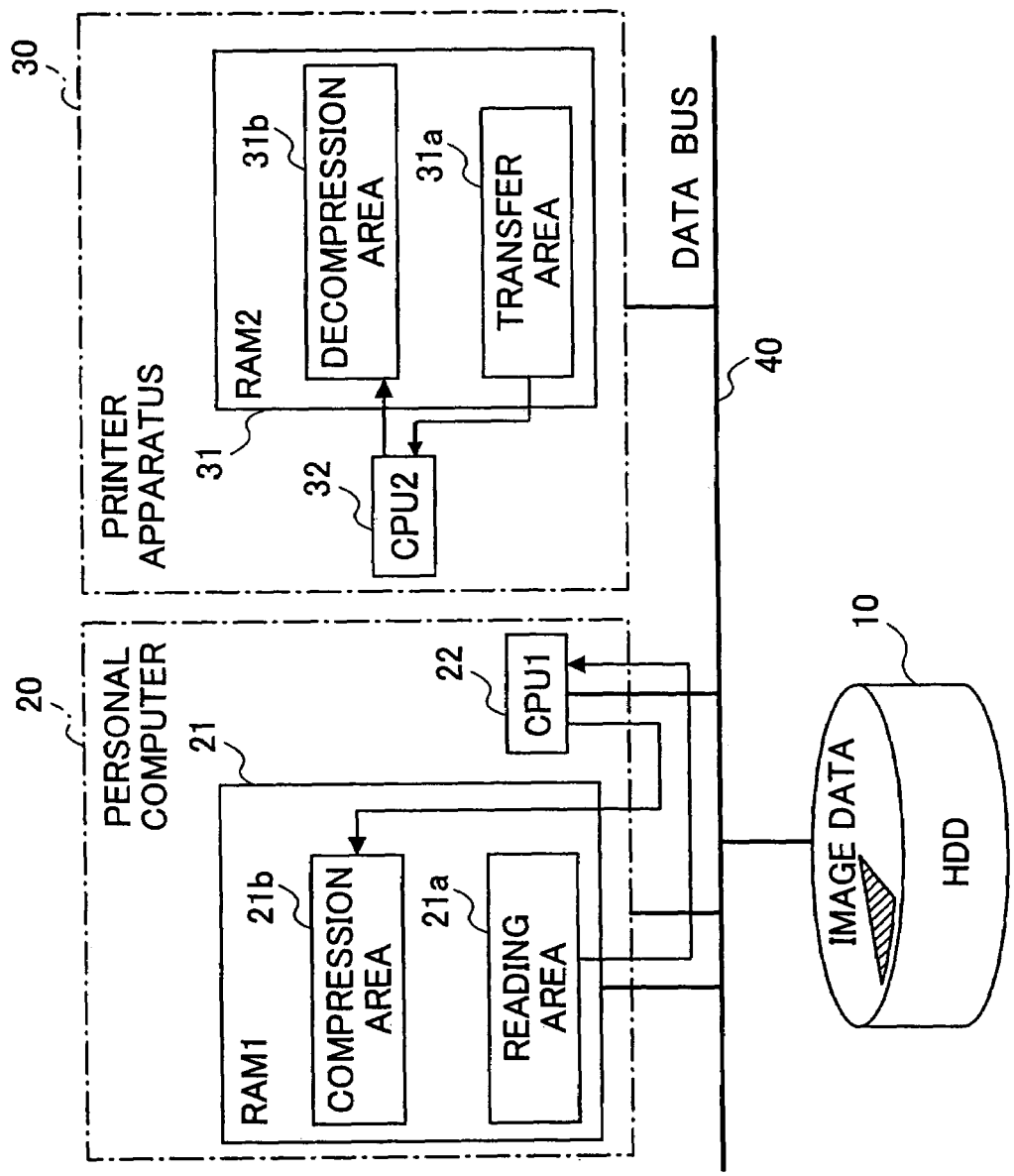
FIG. 5 illustrates a block diagram of an image processing system to which first through sixteenth embodiments of the present invention may be applied.

FIG. 5 is a circuit block diagram showing an example of a configuration of an image compressing/decompressing apparatus which realizes an image compressing/decompressing method according to the present invention.

As shown in FIG. 5, a printer apparatus 30 which carries out printing output image data read out from a hard disk drive unit HDD 10 which stores original image data is connected with a personal computer PC 20 which performs image compression processing, and images having undergone the image processing by the PC 20 is transferred to the printer apparatus 30 via a data bus 40.

In a random access memory RAM 1 (21) image data read out from the hard disk drive unit HDD 10 is written, so that the personal computer PC 20 may perform image compression thereon. A CPU 1 (22) manages and controls the entire personal computer PC 20. By using a random access memory RAM 2 (31), a CPU 2 (32) of the printer apparatus 30 performs image data decompressing operation on image data. The CPU2 manages and controls the entire printer apparatus 30.

When original image data stored in the hard disk drive unit HDD 10 is to be printed out by the printer apparatus 30, the original image data is compressed by the personal computer PC 20, and the compressed image data is transmitted to the printer apparatus 30 through the data bus 40. By the image compression processing, since the amount of transmitting data to the printer apparatus 30 is reduced, the transmitting time is shortened, and even considering the time required for image compression and image decompressing of the original image data, high-speed print-out operation becomes realizable.

First, the original image data recorded in the hard disk drive unit HDD 10 is read out by the CPU 1 (22) of the personal computer PC 20, and is written into a reading area 21a of the random access memory RAM 1 (21) according to instructions given by the CPU 1 (22).

The CPU 1 (22) reads out the original image data from the random access memory RAM 1 (21) appropriately, and performs image compression processing thereon accordingly.

The CPU 1 (22) writes the thus-compressed data into a compression area 21b of the random access memory RAM 1 (21), and stores there temporarily.

After that, the CPU1 (22) gives instructions to the random access memory RAM 1 such that the compressed data is read out therefrom, and, via the data bus 40, it is transferred to the random access memory RAM 2 (31) in the printer apparatus 30, and, is written to a transfer area 31a thereof.

The CPU 2 (32) of the printer apparatus 30 reads out the compressed data from the transfer area 31a of the random access memory RAM 2 (31), obtains decoding values therefrom, performs decompressing processing on the compressed image data, and thus, reproduces a decompressed image having the number of pixels same as that of the original image data.

Then, the CPU 2 32 writes the decompressed image data into a decompression area 31b of the random access memory RAM 2 (31), and stores there, temporarily.

Then, the CPU2 32 reads out the decompressed data from the random access memory RAM 2 (31), and, through predetermined processes, the decompressing image data is printed out on a print paper.

The predetermined processes may include a size-change process by which the number of pixels of the image data is changed according to instructions given by a user or the like.

The image compression processing carried out by the personal computer 20 and the image decompressing processing carried out by the printer apparatus 30 will now be described based on FIGS. 6A and 6B first, and then, following figures, in sequence.

Figure 6A:
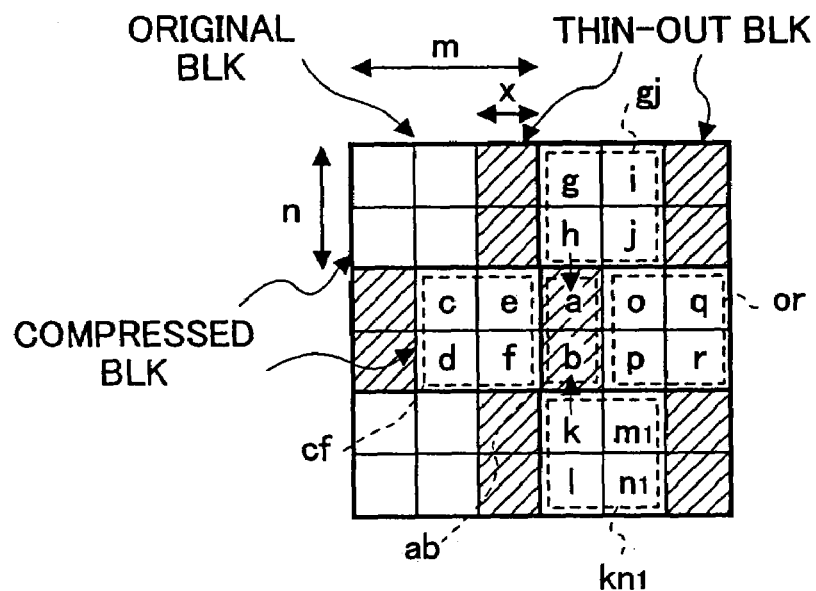
FIGS. 6A and 6B illustrate an image data thinning-out processing scheme according to a first embodiment of the present invention.

FIG. 6A illustrates a concept of a process of compressing an image block of 2×3 pixels into an image block of 2×2 pixels. FIG. 6B illustrates a state of thin lines A and B included in an original image affected by the above-mentioned compression operation.

In this example, as shown in the figures, an image block of original image (original block), from which pixels are thinned out, has n pixels vertically and m pixels horizontally, and, thus, has n×m pixels. Further, an image block which is thinned out from the above-mentioned image block (thinning-out block) of original image has n pixels vertically, and x pixels horizontally, and thus, has n×x pixels. Then, a compressed block obtained after the compression (compressed block) has n pixels vertically, and (m−x) pixels horizontally, and, thus, has n×(m−x) pixels.

Figure 6B:
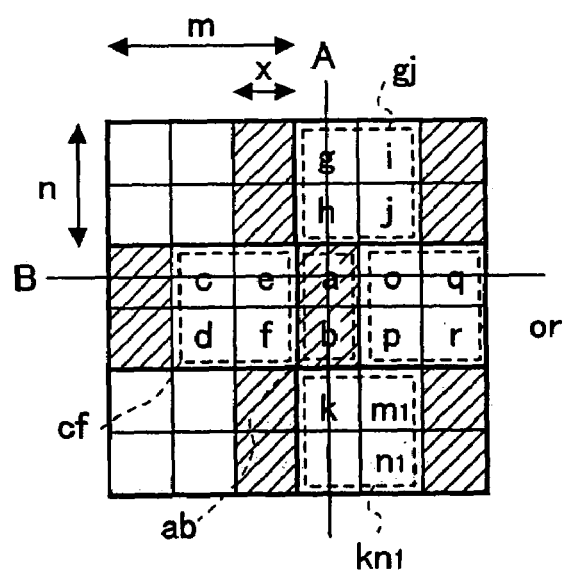

As shown in FIGS. 6A and 6B, in this example, n=2, m=3, x=1. Thus, from the original block of 2×3 pixels, the thinning-out block of 2×1 pixels is thinned out, and, then, the compressed block of 2×2 pixels remains.

Specifically, as shown in the figures, according to the present invention, a position of the thinning-out block with respect to the original block is changed alternately along the vertical direction. In the example shown in the figures, on a first line, the thinning-out block is located at the left end of the original block, then, on a second line, differently, the thinning-out block is located at the right end of the original block, then, on a third line, the left end, . . . . Thus, the position of the thinning-out block with respect to the original block is determined depending on the position along the vertical direction.

Thus, above-mentioned thinning-out processing by an oblique manner or staggering manner can be attained, as shown in the figures. Thereby, as shown in FIG. 6B, pixels on the thin lines or edge lines A (vertically extending) and B (horizontally extending) are lost by thinning-out processing only partially, so that the original image may be prevented from being remarkably apparently degraded.

FIGS. 6A and 6B illustrate the example in which the thinning-out block of n×x is thinned out with respect to the original block of n×m. However, the present invention may also be applied to a case the vertical direction and horizontal direction are reversed from one another, where the thinning-out block of x×n is thinned out with respect to the original block of m×n, by a similar manner.

Then, the thus-obtained compressed image data having 2×2 blocks may be further compressed by a well-known BTC (Block Truncation Coding) compressing scheme by which a lossy compressing scheme, and, thereby, the rate of compression of image data can be further improved.

Next, an image interpolation processing method of carrying out decompressing of the compressed blocks obtained through image compression carried out by thinning-out processing as described above will now be described.

In case an image compressed into the compressed blocks each having 2×2 pixels as shown in FIG. 6A are decompressed into decompressed blocks (corresponding to the original blocks) each having 2×3 pixels, the image data of each pixel of the above-mentioned thinned-out block which includes 2×1 pixels is obtained by interpolation by a nearest pixel method in which image data of pixels of the compressed blocks adjacent to the short sides of the thinned-out block is used for determining image data of the pixels of the thinned-out block.

For example, the thinned-out block ab shown in FIG. 6A has the compressed blocks gj and $kn_1$ adjacent thereto via the short sides thereof. The compressed block 'gj' of 2×2 pixels includes a pixel 'g', a pixel 'h', a pixel 'i', and a pixel 'j', and the compressed block $kn_1$ of 2×2 pixels includes a pixel 'k', a pixel 'l', a pixel $m_1$, and a pixel $n_1$. In this case, the image data of the pixel h adjacent to the upper pixel a of the thinned-out block ab via the short side thereof is used as it is as the image data of the pixel a. Similarly, the image data of the pixel k adjacent to the pixel b of the thinned-out block ab via the bottom short side thereof is used as it is as the image data of the pixel b. Thus, interpolation is performed by the nearest pixel method.

Accordingly, for example, as shown in FIG. 6B, in case the perpendicular thin line A exists on the pixels g, h, and a, b, k, and l, as the pixel a uses the image data of the pixel h, and the pixel b uses the image data of the pixel k as mentioned above through interpolation, the 2 pixels a and b can restore the thin line A properly.

However, if the compressed blocks adjacent to the thinned-out block via the long sides thereof are used for interpolation, that is, if, for the pixel a, the image data of the pixel e is used, and, for the pixel b, the image data of the pixel f is used, the 2 pixels may be lost for the thin line A. However, such a method may also be applied.

In such a case where the interpolation is performed by the nearest pixel method employing compressed blocks adjacent to the thinned-out block via the long sides thereof, both the pixel e and the pixel o are in an equal distance from the pixel a, and, similarly, both the pixel f and the pixel p are in an equal distance from the pixel b, the following method is employed for determining the pixel to be used for the interpolation. That is, the image data of the pixel of the compressed block which constitutes the adjacent original image block to which the thinning-out block does not belong is used. Accordingly, for the pixel a, the image data of the pixel e is used, and, for the pixel b, the image data of the pixel f is used for the interpolation.

In fact, in a case the horizontal thin line B exists on the pixels c, e, and a, o, and q, as shown in FIG. 6B, when the interpolation is made by using the image data of the compressed block of the 2×2 pixels adjacent to the thinned-out block ab via the long side thereof, the image data for one pixel of the thin line B can be correctly restored as, for the pixel a, the image data of the pixel e is used, and, also, for the pixel b, the image data of the pixel f is used.

However, if, in this case, the interpolation is made by employing the compressed block adjacent to the thinned-out block ab via the short side thereof, as, for the pixel a, the image data of the pixel h is used, and, also, for the pixel b, the image data of the pixel k is used, one pixel may be lost for the horizontal thin line B. However, even in this case, only the number of pixels corresponding to the length of the short side, i.e., one pixel is lost for one block.

Thus, by employing the image data of the compressed block adjacent to the thinned-out block via the short sides thereof for interpolation, it is possible to efficiently reduce the number of pixels which are lost therethrough even when loss of pixels concerning a thin line or an edge line occurs therein. Accordingly, even employing the nearest pixel method, which requires merely a reduced processing time, it is possible to prevent the image quality from remarkably degraded, with effectively reducing the processing time for the interpolation.

When image size-change (particularly, image magnification) processing is made in case an image after decompression is output, for example, if the size-change rate (at which the number of pixels is changed) is larger than a predetermined first threshold (for example, larger than '1', i.e., the number of pixels is increased), a well-known-linear interpolation method is employed instead of the above-described nearest pixel method. That is, for example, in case the above-mentioned compressed block of 2×2 pixels is decompressed as shown in FIG. 6A, the respective pixels of the plurality of compressed blocks adjacent to the relevant thinned-out block nearest to the relevant pixel of the thinned-out block are used for determining the image data of the relevant pixel.

For example, in the example shown in FIG. 6A, for the pixels a and b of the thinning-out block ab, the image data of the nearest pixels of the compressed blocks 'cf' and 'or' adjacent to the relevant thinned-out block ab via the long sides thereof are used for interpolation to determine the image data of the pixels a and b, as follows:

As the image data of the pixel a of the thinned-out block ab, the image data of the average value $\{(e+o)/2\}$ of the pixels e and o is used; and as the image data of the pixel b, the image data of the average value $\{(f+p)/2\}$ of the pixels f and p is used.

The reason for employing the linear interpolation instead of the nearest pixel method in case where image magnification processing is performed is as follows:

In such a case, when only one pixel is employed for determining the image data of a thinned-out pixel according to the nearest pixel method, unnaturalness due to the interpolation may become remarkable. Therefore, the linear interpolation method which may provide tone smoothness more effectively than in the case of employing the nearest pixel method, in general, is applied. Thereby, it may be possible to prevent such unnaturalness from being apparent in the reproduced/decompressed image.

Furthermore, in case a decompressed image is magnified still more greatly, i.e., the size-change rate is more than a second predetermined threshold (for example, 2, i.e., the number of pixels is increased more than twice), instead of the linear interpolation method, a third-order interpolation method is used in which, by using a three-order calculation formula, the image data of the thinned-out pixel (interpolation pixel) is determined by using all the compressed blocks adjacent to the relevant thinned-out block.

For example, in the example shown in FIG. 6A, in case the pixel a of the thinned-out block ab is determined when the above-mentioned compressed block of 2×2 pixels is decompressed, the following scheme is applied:

In this case, the image data of 16 pixels of all the four compressed blocks cf, gj, $kn_1$ and or adjacent to the thinned-out block ab are used.

Specifically, the following three-order formula (1) is used:

$$f(a)=f(c)C(x_c-x_a)C(y_c-y_a)+f(d)C(x_d-x_a)C(y_d-y_a)+ \ldots +f(q)C(x_q-x_a)C(y_q-y_a)+f(r)C(x_r-x_a)C(y_r-y_a) \quad (1)$$

where:

f(a) denotes interpolated image data of the pixel a; f(c) denotes the image data of the pixel c; ..., f(q) denotes the image data of the pixel q; and f(r) denotes the image data of the pixel r. $x_a$ and $y_a$ denote x-coordinate value and y-coordinate value of the pixel a on color chromaticity coordinate plane, respectively. $(x_c, x_d, \ldots, x_q, x_r)$ and $(y_c, y_d, \ldots, y_q, y_r)$ denote x-coordinate values and y-coordinate values of pixels c, d, ..., q and r on the color chromaticity coordinate plane, respectively.

C(t) is an approximation formulas of a function {sin πt/πt} which constitutes a sampling theorem, and one of the following formulas (2), (3) and (4) is applied according to the value of the variable t, as follows:

$$C(t)=1-2t^2+|t|^3, \text{ in case } 0 \leq |t| < 1 \quad (2);$$

$$C(t)=4-8|t|+5t^2-|t|^3, \text{ in case } 1 \leq |t| < 2 \quad (3);$$

$$C(t)=0, \text{ in case } 2 \leq |t| \quad (4)$$

According to the three-order interpolation method, as the plurality of pixels of compressed blocks present in the periphery of the relevant pixel are utilized, although the processing speed becomes decreased, it is possible to provide further higher image quality in comparison to the case of employing the linear interpolation method.

The above-mentioned first and second predetermined thresholds should be determined according to various conditions such as image display performance of an image compression/decompression apparatus used, an observation distance at a time of observation thereof, and so forth. Accordingly, the above-mentioned values (for example, '1' and '2') are merely examples.

Figure 10:
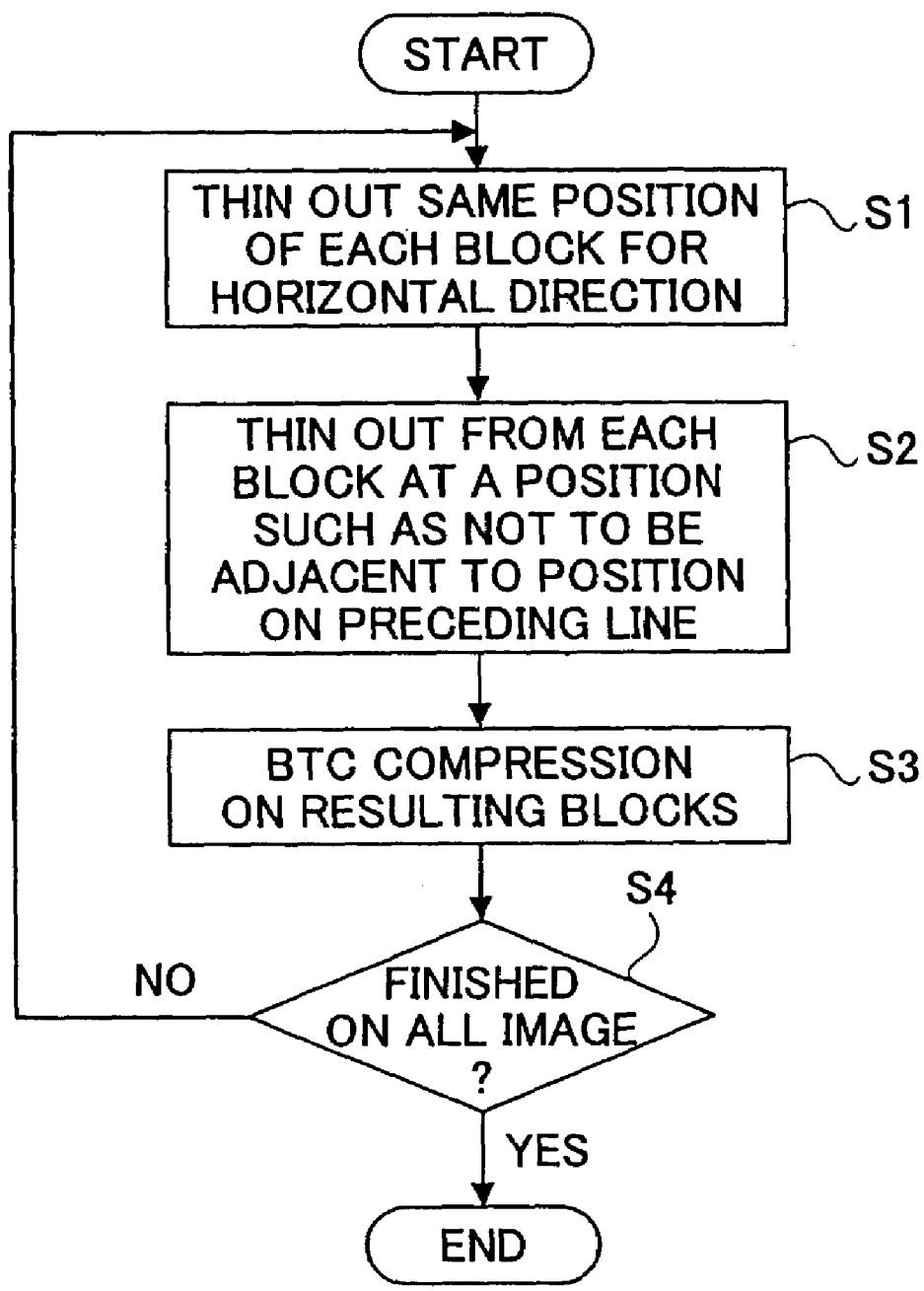
FIG. 10 illustrates processing illustrated with reference to FIGS. 6A and 6B.
Figure 11:
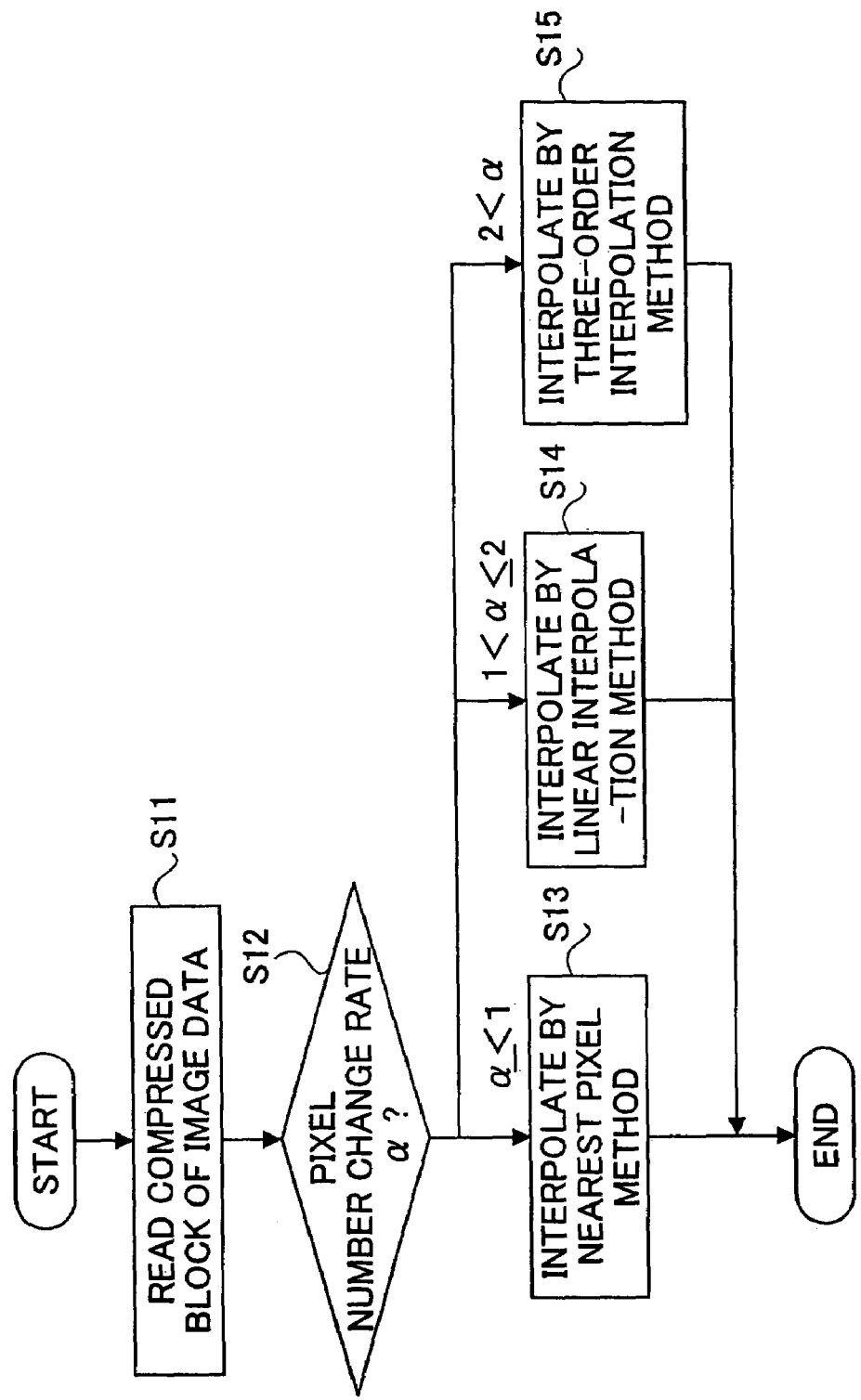
FIG. 11 illustrates processing of image data interpolation for interpolating pixels thinned out as illustrated with reference to FIGS. 6A and 6B.

FIGS. 10 and 11 are flow charts showing flows of processing of the above-described image compressing/decompressing methods. That is, FIG. 10 is a flow chart illustrating an example of a flow of processing according to an image compression technology according to the first embodiment of the present invention, and FIG. 11 is a flow chart illustrating an example of a flow of image decompression processing according to the present invention for decompressing image data compressed according to the processing illustrated in FIG. 10.

The flow of the image compression processing shown in FIG. 10 will now be described.

When compressing horizontally original image blocks each including 2×3 pixels which is a unit area to be compressed, the block of 2×1 pixels to be thinned out is located in the same position with respect to each original block (for example, the right end) throughout the same line (in a step S1). On the other hand, with respect to the vertical direction, the location of the thinned-out block of 2×1 pixels with respect to each original block of 2×3 pixels is determined so that the thinned-out block is not adjacent to any thinned-out block on the immediately preceding line (for example, the left end in case the thinned-out block is located at the right end on the immediately preceding line) (in a step S2).

Furthermore, as for the compressed blocks each including 2×2 pixels after thinning out the thinning-out blocks each of 2×1 pixels from the original blocks each of 2×3 pixels, lossy compression is performed thereon based on the BTC method (in a step S3).

Then, in a step S4, when all the original blocks have not undergone the thinning-out processing, the above-described process (steps S1 through S3) is repeated. After all the original blocks have been processed, the image compressing processing is finished.

The flow of image decompressing processing shown in FIG. 11 will now be described.

Image data having 2×2 pixels which is a compressed block is read (in a step S11).

Then, a size-change rate α (pixel number change rate) on the relevant image for size change processing (pixel number change processing) performed when the decompressed image is output is determined (in a step S12).

In case the size-change rate is not more than the first predetermined threshold (for example, "1"), interpolation is performed according to the nearest pixel method such that the image data of each pixel of the thinned-out block is determined from the image data of the pixel adjacent thereto via the short side of the block, as described above (in a step S13).

In case the size-change rate is more than the first predetermined threshold (for example, "1") and also not more than the second predetermined threshold (for example, "2"), interpolation is performed according to the linear interpolation method such that the image data of each pixel of the thinned-out block is determined from the image data of the pixels nearest thereto of the plurality of compressed blocks adjacent to the thinned-out block, for example, via the long sides thereof, as described above (in a step S14).

In case the size-change rate is more than the second predetermined threshold (for example, "2"), interpolation is performed according to the three-order interpolation method such that the image data of each pixel of the thinned-out block is determined from the image data of the respective pixels of all the compressed blocks adjacent to the thinned-out block, as described above (in a step S14).

Figure 7:
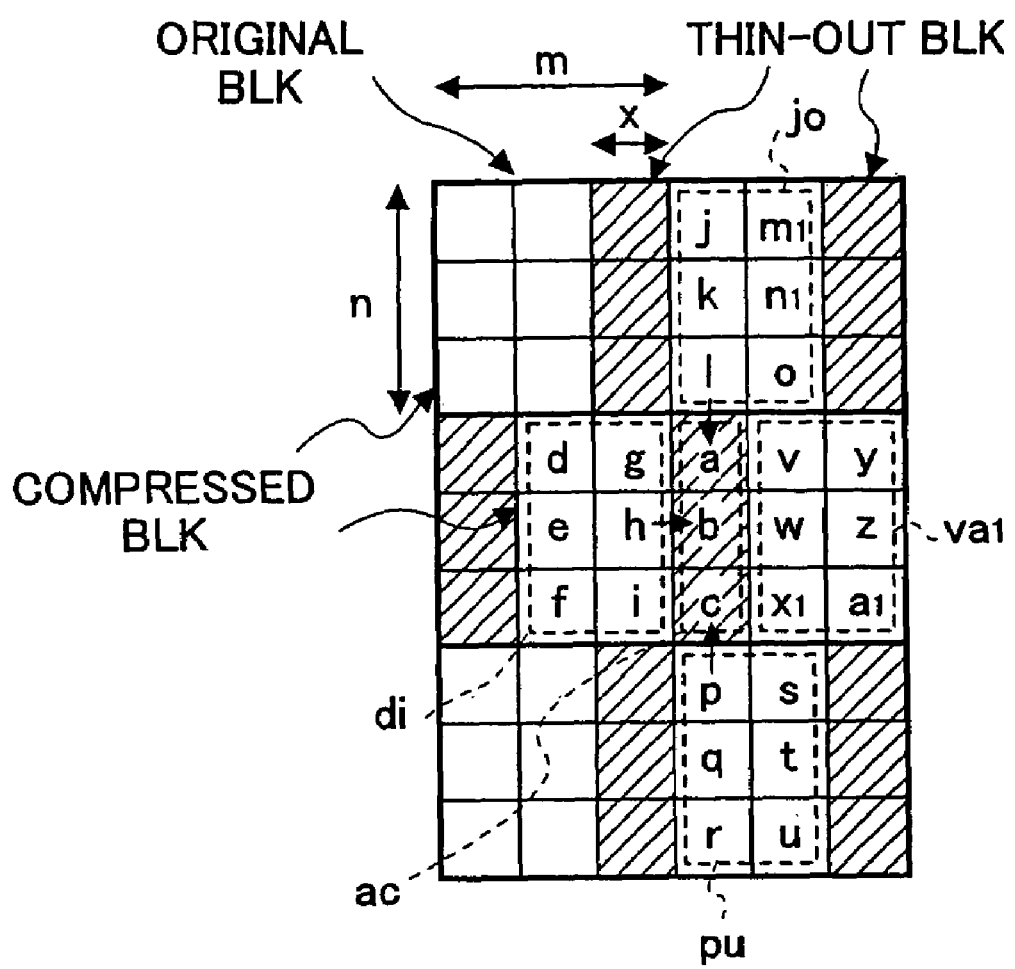
FIG. 7 illustrates an image data thinning-out processing scheme according to a second embodiment of the present invention.

With reference to FIG. 7, image compression scheme and interpolation scheme according to a second embodiment of the present invention in case the number of pixels in a vertical direction of thinning-out/thinned-out block is equal to or more than three will now be described.

In FIG. 7, in case color image data is compressed, each of original image blocks from which thinning-out blocks are thinned out/removed includes 3×3 pixels. In the figure, 3×2 pixels shown as a white portion of each original image block are extracted as a compressed block after image compression, and 3×1 pixels shown as a hatched portion at the right or left end of each original image block are removed as a thinned-out block.

Specifically, during image data compression according to the second embodiment of the present invention illustrated by FIG. 7, on the horizontal direction, the position of the thinning-out/thinned-out block with respect to each original image block is the same for the same line. However, on the vertical direction, the position of the thinning-out/thinned-out block with respect to each original image block is determined so that the thinning-out/thinned-out block may not be adjacent to or may not align with any thinning-out/ thinned-out block on the immediately preceding line. For example, in the example shown in FIG. 7, the position of the thinning-out/thinned-out block is the right end with respect to each original image block on the first line, but is the left end on the second line, then is the right end on the third line, . . . . By thus proceeding with thinning-out processing by repeating for respective lines of original image blocks according to the simple rule, the thinning-out/thinned-out blocks are positioned so that they are not adjacent to or not aligned with each other, as shown in FIG. 7, for example.

Also in this embodiment, it is possible that the horizontal direction and vertical direction are replaced with one another. That is, the position of the thinning-out/thinned-out block is the same on the same column for the vertical direction, and, the position thereof is determined so that the thinning-out/thinned-out block may not adjacent to or may not align with any thinning-out/thinned-out block on the immediately preceding column.

Thereby, as the respective thinning-out/thinned-out blocks are not adjacent to or not aligned with each other between any adjacent original image blocks, a situation that all the pixels arranged straightly in horizontal direction or vertical direction are thinned out/removed by compression processing can be positively prevented. Accordingly, it is possible to prevent thin line/edge lines extending vertically or horizontally from being lost remarkably through image compression and decompression processing. Thus, it is possible to maintain a high image quality.

Then, after the above-described thinning-out processing, the above-mentioned BTC compression (lossy compression) is performed on the compressed blocks, and, thereby, the compression rate is further increased.

Image interpolation scheme in image decompression of the thus-obtained compressed image data will now be described.

According to the second embodiment, as shown in FIG. 7, the number of pixels of each thinning-out/thinned-out block in the vertical direction is more than two. Accordingly, both vertical end pixels of the thinning-out/thinned-out block are determined by the pixels of the compressed blocks adjacent to the thinning-out/thinned-out block via the short sides thereof in the nearest pixel method as in the above-described first embodiment. In contrast thereto, as to the intermediate pixel, the image data thereof is determined by the image data of the pixel of the compressed block adjacent to the thinning-out/thinned-out block via the long side thereof but not included in the original image block in which the relevant thinning-out/thinned-out block is included.

Specifically, in the example shown in FIG. 7, the thinning-out/thinned-out block ac of 3×1 pixels includes pixels a, b and c; the compressed block jo of 3×2 pixels includes j, k, l, $m_1$, $n_1$, and o adjacent to the above-mentioned thinning-out/thinned-out block ac via the top short side thereof; the compressed block pu of 3×2 pixels includes p, q, r, s, t, and u adjacent to the above-mentioned thinning-out/thinned-out block ac via the bottom short side thereof; and the compressed block di of 3×2 pixels includes d, e, f, g, h, and i adjacent to the above-mentioned thinning-out/thinned-out block ac via the left long side thereof but not included in the original image block in which the thinning-out/thinned-out block ac is included.

In this case, according to the above-described scheme, the image data of the top pixel a of the thinning-out/thinned-out block ac is determined as the image data of the pixel l adjacent thereto on the top side; the image data of the bottom pixel c of the thinning-out/thinned-out block ac is determined as the image data of the pixel p adjacent thereto on the bottom side; and the image data of the intermediate pixel b of the thinning-out/thinned-out block ac is determined as the image data of the pixel h adjacent thereto on the left side.

Thereby, similarly to the case of the above-described first embodiment illustrated in FIGS. 6A and 6B, as the pixels of the thinning-out/thinned-out block adjacent to the short sides thereof are determined by using the pixels of the compressed blocks adjacent to the thinning-out/thinned-out block via the short sides thereof according to the nearest pixel method, it is possible to effectively reduce the number of pixels lost from thin line/edge line extending vertically during image compression and decompression processing.

Furthermore, as to the intermediate pixel of the thinning-out/thinned-out block, the image data thereof is determined by using the nearest pixel but adjacent to the pixel to be determined in the direction other than the direction of the above-mentioned case of interpolation manner for the pixels adjacent to the short sides of the thinning-out/thinned-out block. Accordingly, the direction of interpolation is not fixed to vertical or horizontal, but various directions are used for the interpolation. Thereby, it is possible to easily maintain the image quality from remarkably degraded.

Thus, according to the second embodiment, same as in the first embodiment, as the pixel thinning scheme is improved, it is possible to maintain a high image quality during image compression and decompression by interpolation although employing the nearest pixel method which merely requires a reduced processing time. Accordingly, it is possible to attain high speed interpolation processing.

In the second embodiment, the flows of processing of image compression and image decompression are the same as those of the above-described first embodiment illustrated in FIGS. 10 and 11. However, different from the first embodiment, the original image block has 3×3 pixels, and the thinning-out/thinned-out block has 3×1 pixels, as mentioned above. Especially, according to the second embodiment, as the number of pixels of the thinning-out/thinned-out block along the vertical direction is more than two, image data of the intermediate pixel(s) is determined in decompression processing by using the pixel(s) of the compressed block adjacent to the thinning-out/thinned-out block but not included in the original image block in which the thinning-out/thinned-out block is included, as described above.

Although the above-described second embodiment employs the original block of 3×3 pixels and thinning-out/thinned-out block of 3×1 pixels, the basically same concept may be applied to a case where the number of pixels along the vertical direction increases more than three, i.e., four, five, . . . . That is, the concept of the second embodiment may also be applied to a case employing the original block of 4×3 pixels and thinning-out/thinned-out block of 4×1 pixels . . . . In such a case, the number of the above-mentioned intermediate pixels becomes more than one, i.e., two, three, . . .

Figure 8:
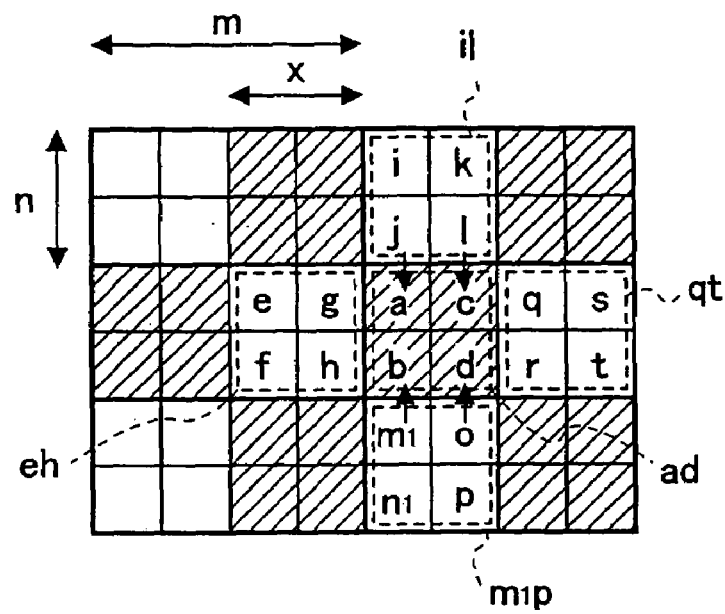
FIG. 8 illustrates an image data thinning-out processing scheme according to a third embodiment of the present invention.

With reference to FIG. 8, image compression scheme and interpolation scheme according to a third embodiment of the present invention in case the number of pixels of thinning-out/thinned-out block is half the number of the original image block will now be described.

In FIG. 8, in case color image data is compressed, each of original image blocks from which thinning-out blocks are thinned out includes 2×4 pixels. In the figure, 2×2 pixels shown as a white portion of each original image block are extracted as a compressed block after image compression, and 2×2 pixels shown as a hatched portion at the right or left end of each original image block are removed off as a thinned-out block.

Specifically, during image data compression according to the third embodiment of the present invention illustrated by FIG. 8, on the horizontal direction, the position of the thinning-out/thinned-out block with respect to each original image block is the same for the same line. However, on the vertical direction, the position of the thinning-out/thinned-out block with respect to each original image block is determined so that the thinning-out/thinned-out block may not be adjacent to or may not align with any thinning-out/thinned-out block on the immediately preceding line. For example, in the example shown in FIG. 8, the position of the thinning-out/thinned-out block is the right end with respect to each original image block on the first line, but is the left end on the second line. By proceeding with thinning-out processing by repeating for respective lines of original image blocks according to the simple rule, the thinning-out/thinned-out blocks are positioned so that they are not adjacent to or not aligned with each other, as shown in FIG. 8, for example.

Also in this embodiment, it is possible that the horizontal direction and vertical direction are replaced with one another. That is, the position of the thinning-out/thinned-out block is the same on the same column for the vertical direction, and, the position thereof is determined so that the thinning-out/thinned-out block may not adjacent to any thinning-out/thinned-out block on the immediately preceding column.

Thereby, as the respective thinning-out/thinned-out blocks are not adjacent to or not aligned with each other between any adjacent original image blocks, a situation that all the pixels arranged straightly in horizontal direction or vertical direction are thinned out/removed by compression processing can be positively prevented. Accordingly, it is possible to prevent thin line/edge line extending vertically or horizontally from being lost remarkably through image compression and decompression processing. Thus, it is possible to easily maintain a high image quality.

Then, after the above-described thinning-out processing the above-mentioned BTC compression (lossy compression) is performed on the compressed blocks, and, thereby, the compression rate is further increased.

Image interpolation scheme in image decompression of the thus-obtained compressed image data will now be described.

In order to obtain a decompressed block of 2×4 pixels from the compressed block of 2×2 pixels through decompression in the example shown in FIG. 8, the above-mentioned thinning-out/thinned-out block is obtained by interpolation by using the pixels of the compressed blocks adjacent to the thinning-out/thinned-out block via the short sides thereof according to the nearest pixel method.

Specifically, in the example shown in FIG. 8, the thinning-out/thinned-out block ad of 2×2 pixels includes pixels a, b, c and d; the compressed block il of 2×2 pixels includes i, j, k and l adjacent to the above-mentioned thinning-out/thinned-out block ad via the top short side thereof; the compressed block $m_1 p$ of 2×2 pixels includes $m_1$, $n_1$, o and p adjacent to the above-mentioned thinning-out/thinned-out block ad via the bottom short side thereof.

In this case, according to the above-described scheme, the image data of the top pixel a of the thinning-out/thinned-out block ad is determined as the image data of the pixel j adjacent thereto on the top side; the image data of the top pixel b of the thinning-out/thinned-out block ad is determined as the image data of the pixel $m_1$ adjacent thereto on the bottom side; the image data of the top pixel c of the thinning-out/thinned-out block ad is determined as the image data of the pixel l adjacent thereto on the top side; the image data of the top pixel d of the thinning-out/thinned-out block ad is determined as the image data of the pixel o adjacent thereto on the bottom side, as shown in FIG. 8.

Thereby, similarly to the case of the above-described first embodiment illustrated in FIGS. 6A and 6B, as the pixels of the thinning-out/thinned-out block adjacent to the short sides thereof are determined by using the pixels of the compressed blocks adjacent to the thinning-out/thinned-out block via the short sides thereof according to the nearest pixel method, it is possible to effectively reduce the number of pixels lost from thin line/edge line extending vertically during image compression and decompression processing. Thereby, it is possible to easily maintain the image quality. Thus, even when thin line/edge line is lost through compression and decompression, the number of pixels lost can be effectively reduced.

Thus, also according to the third embodiment, same as in the first embodiment, as the pixel thinning scheme is improved, it is possible to maintain a high image quality during image compression and decompression by interpolation although employing the nearest pixel method which requires reduced processing time. Accordingly, it is possible to attain high speed interpolation processing.

Figure 12:
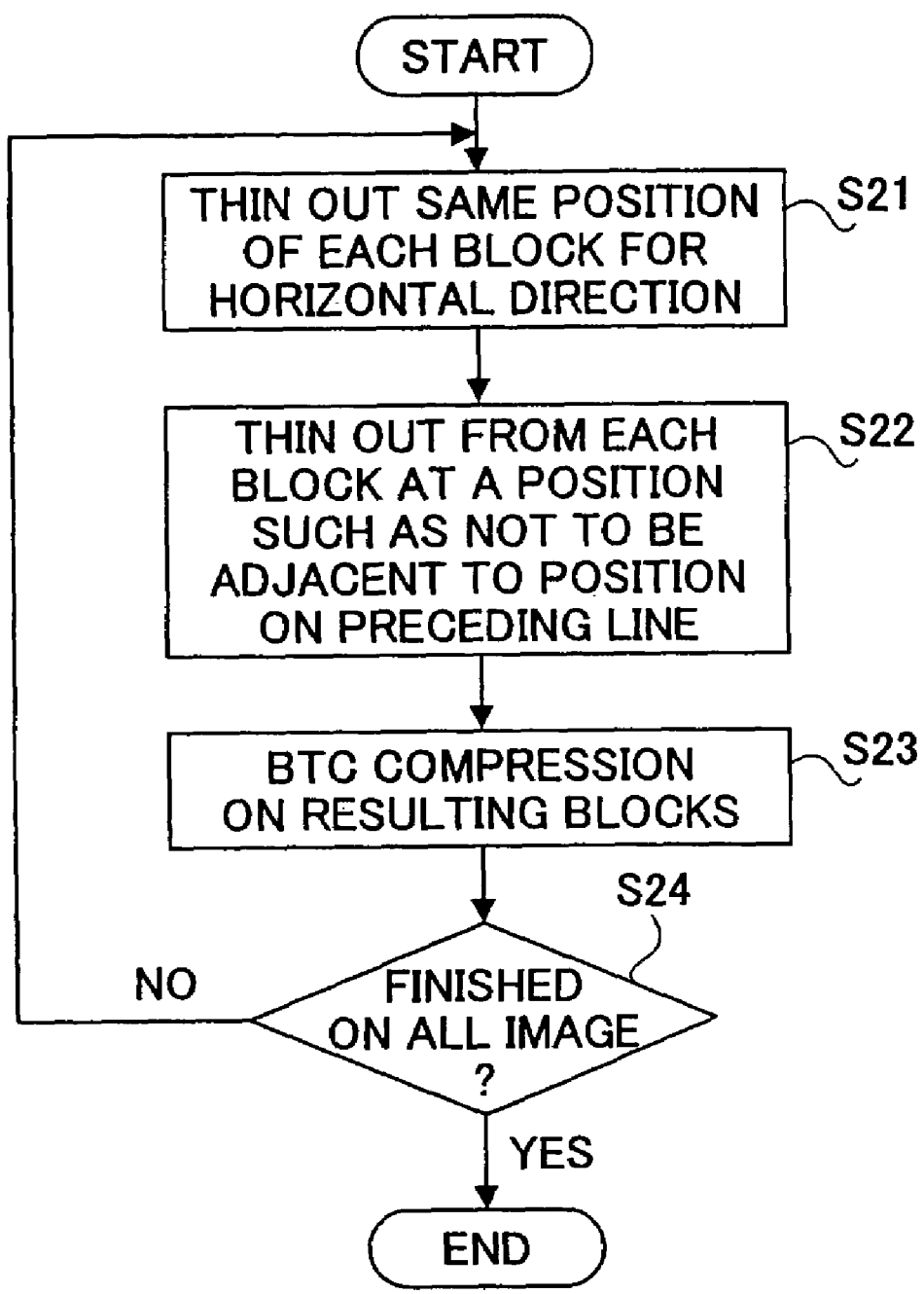
FIG. 12 illustrates processing illustrated with reference to FIG. 8.

In the third embodiment, as shown in FIG. 12, when compressing horizontally original image blocks each including 2×4 pixels which is a unit area to be compressed, the block of 2×2 pixels to be thinned out is located in the same position with respect to each original block (for example, the right end) throughout the same line (in a step S21). On the other hand, with respect to the vertical direction, the location of the thinned-out block of 2×2 pixels with respect to each original block of 2×4 pixels is determined so that the thinned-out block is not adjacent to or not aligned with the thinned-out block on the immediately preceding line (for example, the left end in case the thinned-out block is located at the right end on the immediately preceding line) (in a step S22).

Furthermore, as for the compressed blocks each including 2×2 pixels after thinning out the thinning-out blocks each of 2×2 pixels have been thinned out from the original blocks each of 2×4 pixels, lossy compression is made based on the BTC method (in a step S23).

Then, in a step S24, when all the original blocks have not undergone the thinning-out processing, the above-described process (steps S21 through S23) is repeated. After all the original blocks have been processed, the image compressing processing is finished.

The flow of processing of image decompression is the same as that of the above-described first embodiment illustrated in FIG. 11. However, different from the first embodiment, the original image block has 2×4 pixels, and the thinning-out/thinned-out block has 2×2 pixels, as mentioned above.

Figure 9:
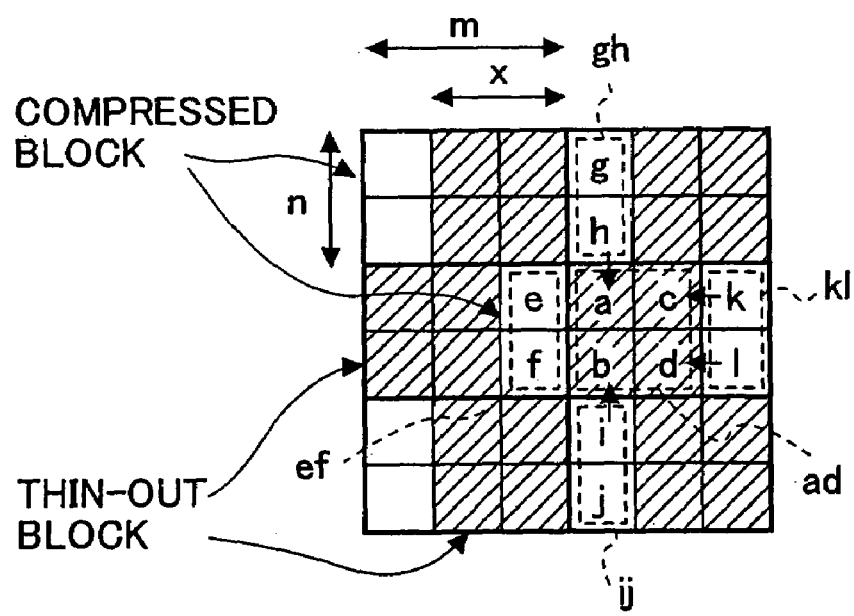
FIG. 9 illustrates an image data thinning-out processing scheme according to a fourth embodiment of the present invention.

With reference to FIG. 9, image compression scheme and interpolation scheme according to a fourth embodiment of the present invention in case the number of pixels of the thinning-out/thinned-out block is smaller than half the number of pixels of the original image block will now be described.

In FIG. 9, in case color image data is compressed, each of original image blocks from which thinning-out blocks are thinned out includes 2×3 pixels. In the figure, 2×1 pixels shown as a white portion of each original image block are extracted as a compressed block after image compression, and 2×2 pixels shown as a hatched portion at the right or left end of each original image block are removed as a thinned-out block.

Specifically, during image data compression according to the fourth embodiment of the present invention illustrated by FIG. 9, in the horizontal direction, the position of the thinning-out/thinned-out block with respect to each original image block is the same for the same line. However, in the vertical direction, the position of the thinning-out/thinned-out block with respect to each original image block is determined so that the compressed block to be left, instead of the thinning-out/thinned-out block, may not be adjacent to or may not aligned with any compressed block on the immediately preceding line. For example, in the example shown in FIG. 9, the position of the compressed block is the left end with respect to each original image block on the first line, but is the right end on the second line. By proceeding with thinning-out processing by repeating for respective lines of original image blocks according to the simple rule, the compressed blocks are positioned so that they are not adjacent to or not aligned with each other, as shown in FIG. 9, for example.

Also in this embodiment, it is possible that the horizontal direction and vertical direction are replaced with one another. That is, the position of the thinning-out/thinned-out block is the same on the same column for the vertical direction, and, the position of the compressed block is determined so that the compressed block to be left may not adjacent to or may not align with any compressed block on the immediately preceding column.

Thereby, as the respective compressed blocks are not adjacent to or not aligned with each other between any adjacent original image blocks, a situation that all the pixels arranged straightly in horizontal direction or vertical direction are thinned out/removed by compression processing can be prevented. Accordingly, it is possible to prevent thin line/edge line extending vertically or horizontally from being lost through image compression and decompression processing. Thus, it is possible to maintain high image quality.

Then, after the above-described thinning-out processing the above-mentioned BTC compression (lossy compression) is performed on the compressed blocks, and, thereby, the compression rate is further increased.

According to the fourth embodiment, in comparison to the first embodiment, the compression rate can be improved from 1.5 to 3. Accordingly, it is possible to effectively reduce a transmission time from the personal computer 20 to the printer apparatus 30.

Image interpolation scheme in image decompression of the thus-obtained compressed image data will now be described.

In order to obtain a decompressed block of 2×3 pixels from the compressed block of 2×1 pixels through decompression in the example shown in FIG. 9, the above-mentioned thinning-out/thinned-out block is obtained by interpolation by using the pixels of the compressed blocks adjacent to the thinning-out/thinned-out block via the short sides thereof according to the nearest pixel method.

Specifically, in the example shown in FIG. 9, the thinning-out/thinned-out block ad of 2×2 pixels includes pixels a, b, c and d; the compressed block gh of 2×1 pixels includes g and h adjacent to the above-mentioned thinning-out/thinned-out block ad via the top short side thereof; the compressed block ef of 2×1 pixels includes e and f adjacent to the above-mentioned thinning-out/thinned-out block ad via the left short side thereof; the compressed block ij of 2×1 pixels includes i and j adjacent to the above-mentioned thinning-out/thinned-out block ad via the bottom short side thereof; and the compressed block kl of 2×1 pixels includes k and l adjacent to the above-mentioned thinning-out/thinned-out block ad via the right short side thereof, as shown in the figure.

In this case, according to the above-described scheme, the image data of the top pixel a of the thinning-out/thinned-out block ad is determined as the image data of the pixel h adjacent thereto on the top side; the image data of the bottom pixel b of the thinning-out/thinned-out block ad is determined as the image data of the pixel i adjacent thereto on the bottom side; the image data of the top pixel c of the thinning-out/thinned-out block ad is determined as the image data of the pixel k adjacent thereto on the right side; and the image data of the top pixel d of the thinning-out/thinned-out block ad is determined as the image data of the pixel l adjacent thereto on the right side, as shown in FIG. 9.

Thereby, similarly to the case of the above-described first embodiment illustrated in FIGS. 6A and 6B, as the pixels of the thinning-out/thinned-out block adjacent to the short sides thereof are determined by using the pixels of the compressed blocks adjacent to the thinning-out/thinned-out block via these short sides thereof according to the nearest pixel method, it is possible to effectively reduce the number of pixels lost from thin line/edge line extending vertically during image compression and decompression processing. Accordingly, the direction of interpolation is not fixed to vertical or horizontal, but various directions are used for the interpolation. Thereby, it is possible to easily maintain the image quality. Thus, even when thin line/edge line is lost through compression and decompression, the number of pixels lost can be effectively reduced.

In each of the above-mentioned second through fourth embodiments, it is also possible to employ the above-described linear interpolation method or three-order interpolation method instead of the nearest pixel method, as described above.

Thus, also according to the fourth embodiment, same as in the first embodiment, as the pixel thinning scheme is improved, it is possible to maintain a high image quality during image compression and decompression by interpolation although employing the nearest pixel method which requires reduced processing time. Accordingly, it is possible to attain high speed interpolation processing.

Figure 13:
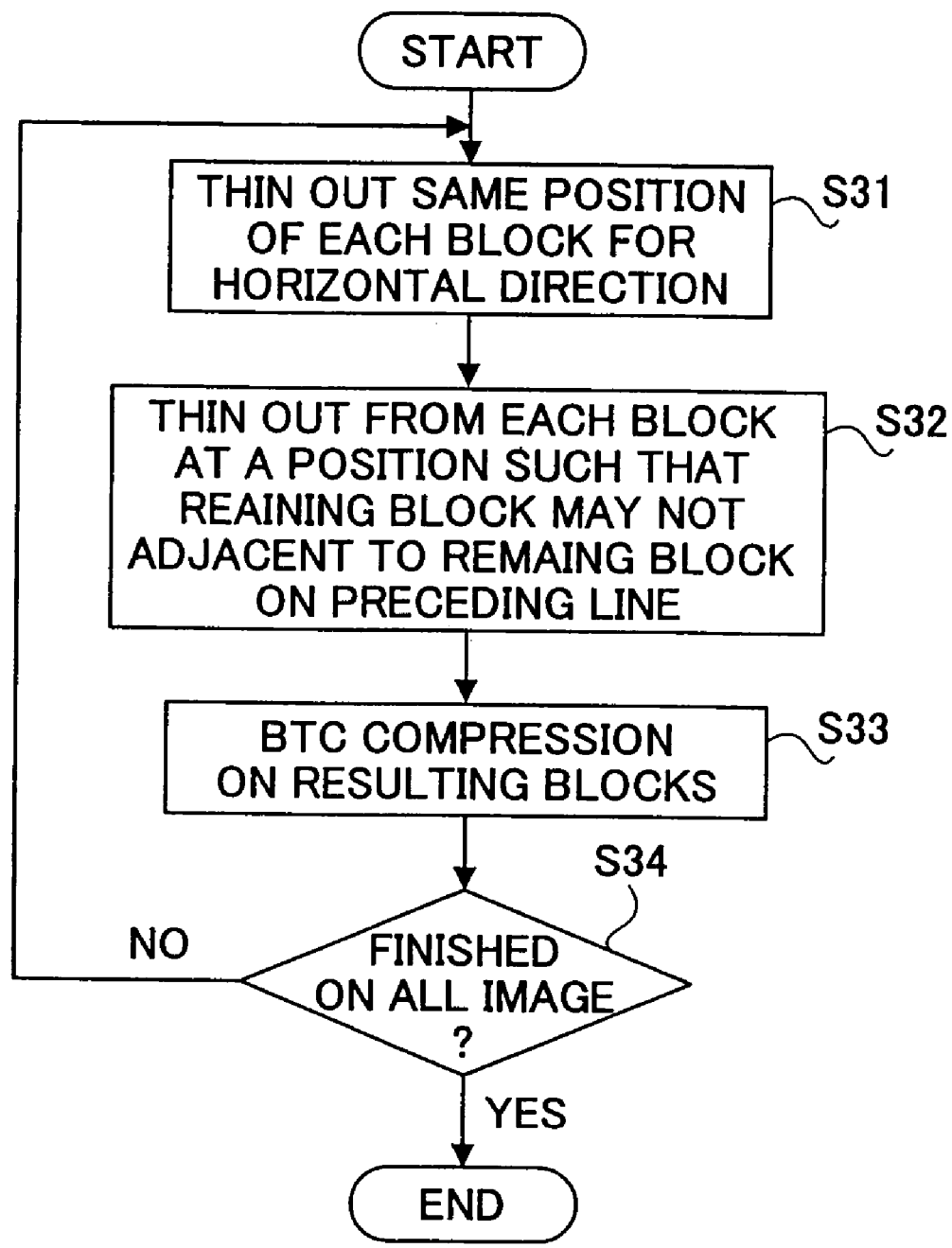
FIG. 13 illustrates processing illustrated with reference to FIG. 9.

In the fourth embodiment, as shown in FIG. 13, when compressing horizontally original image blocks each including 2×3 pixels which is a unit area to be compressed, the block of 2×2 pixels to be thinned out is located in the same position with respect to each original block (for example, the right end) throughout the same line (in a step S31). On the other hand, with respect to the vertical direction, the location of the compressed block of 2×1 pixels with respect to each original block of 2×3 pixels is determined so that the compressed block is not adjacent to or not aligned with any compressed block on the immediately preceding line (for example, the left end in case the thinned-out block is located at the right end on the immediately preceding line) (in a step S32).

Furthermore, as for the compressed blocks each including 2×1 pixels after thinning out the thinning-out blocks each of 2×2 pixels have been thinned out from the original blocks each of 2×3 pixels, lossy compression is made based on the BTC method (in a step S33).

Then, in a step S34, when all the original blocks have not undergone the thinning-out processing, the above-described process (steps S31 through S33) is repeated. After all the original blocks have been processed, the image compressing processing is finished.

The flow of processing of image decompression is the same as that of the above-described first embodiment illustrated in FIG. 11. However, different from the first embodiment, the original image block has 2×3 pixels, and the thinning-out/thinned-out block has 2×2 pixels, as mentioned above.

After that, embodiments of how to select one of, and/or to combine the above-mentioned nearest pixel method, linear interpolation method and three-order interpolation method according to positions of thinning-out/thinned-out pixels to be generated from a compressed block with respect to the positions of pixels of the compressed block will now be described. According to the schemes of the embodiments which will be described now, it is possible to prevent an image quality from being remarkably apparently degraded during image compression and decompression processes, even when relatively large areas are thinned out through the compression process so as to increase the compression rate.

Figure 14:
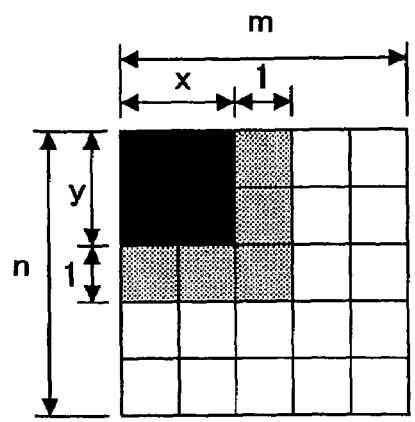
FIG. 14 illustrates a basic image data interpolation pattern according to a fifth embodiment of the present invention.
Figure 15A:
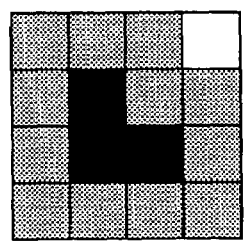
FIGS. 15A through 15C illustrate various types of definition of adjacent pixels for illustrating the present invention.
Figure 15B:
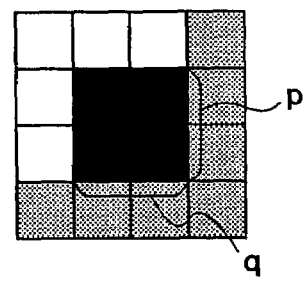
Figure 15C:
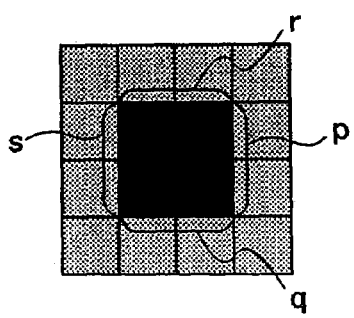

FIG. 14 illustrates a basic interpolation pattern in an image interpolation method according to the embodiments which will be described now. With regard to color image data, 5×5 pixels are used as a unit, and, when the 5×5 pixels are generated from 2×2 pixels (indicated by black in the figure), two types of interpolation methods are used for pixels other than the pixels indicated by black. For example, in case the pixels (indicated by gray in the figure) are adjacent to the pixels of the black zone as shown in the figure, the first interpolation method is applied to generate the pixels of the gray zone while the second interpolation method, different from the first interpolation method, is applied to generated the other pixels (indicated by white).

FIGS. 12A through 12C illustrate definition of "adjacent pixels" applied to the description below. First, FIG. 12A shows adjacent pixels (gray zone) of image area indicated by black. As shown in the figure, the adjacent pixels are those possessing a side or a vertex of the relevant image area (black zone) in common. The meaning of "in common" in this case is a conceptual one, and, thus, may also be widely applied to a case respective pixels are spaced from each other. FIG. 12B shows adjacent pixels (gray zone) of the two sides q and q of the relevant image area (black zone) in case the relevant image zone has a rectangular shape as shown in the figure. FIG. 12C shows adjacent pixels (gray zone) of the respective four sides p, q, s and r of the relevant image area (black zone). A term "pixel group" which will occur also means a single pixel.

Figures 16, 17:
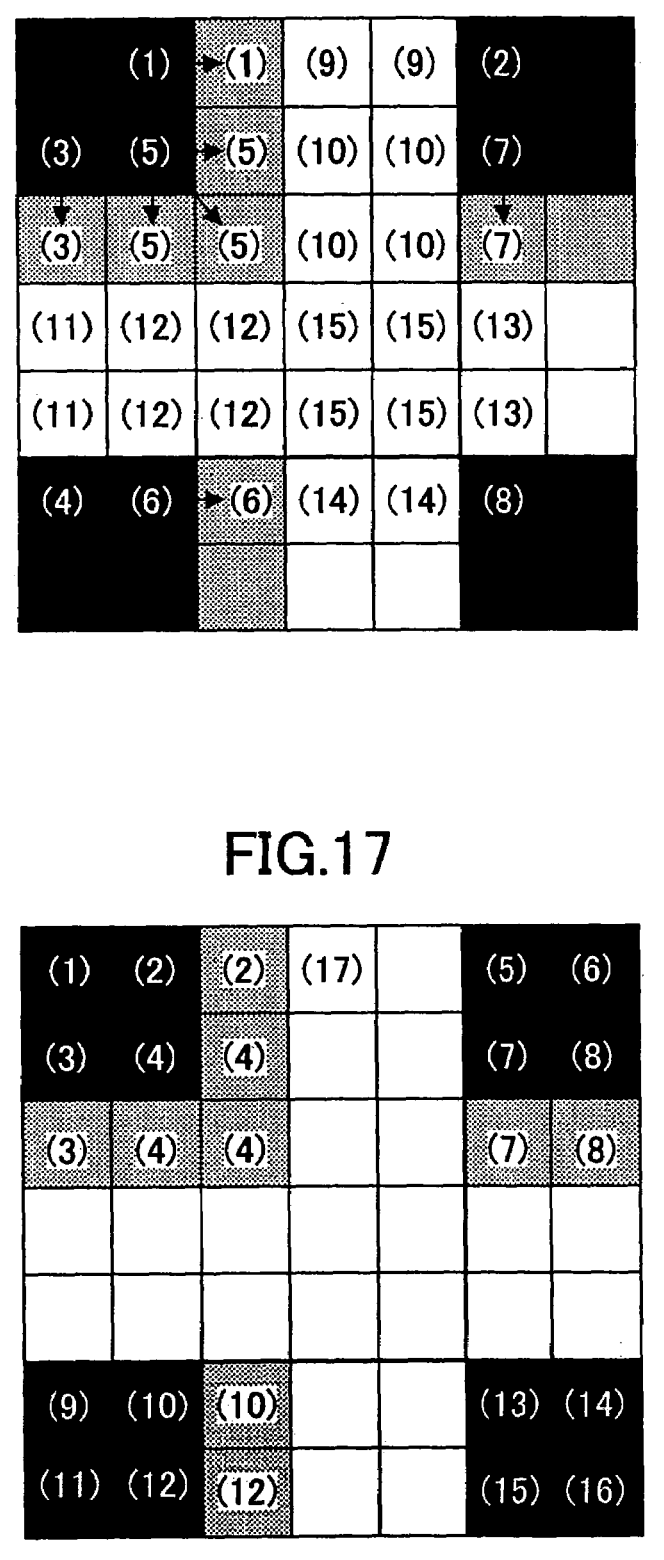

FIG. 16 illustrates one example of image interpolation method according to a fifth embodiment of the present invention. As shown in the figure, for the gray zone, the interpolation is performed according to the nearest pixel method, and, thus, the image data of the adjacent pixel of the black zone is applied as it is so that (1)→(1); (3)→(3); (5)→(5), . . . . With regard to the white zone, the linear interpolation method is applied, and, thus, ((1)+(2))/2→(9); ((5)+(7))/2→(10); ((3)+(4))/2→(11); ((5)+(6))/2→(12); ((7)+(8))/2→(13); ((6)+(8))/2→(14); ((12)+(13))/2→(15).

FIG. 17 shows another example of the image interpolation method according to the fifth embodiment of the present invention. Also in this example, same as in the example shown in FIG. 16, the image data of the pixels in the gray zone is determined by the nearest pixel method by using the image data of the pixels in the black zone as shown in the figure. However, the image data of the pixels in the white zone is determined according to the three-order interpolation method.

Specifically, assuming that the coordinate system of the original image is of X-Y while the coordinate system of the image data after coordinate transformation is of X'-Y', the relationship therebetween can be expressed by the following formulas (I) and (II) assuming that the relationship between both the coordinate systems is linear:

$$x = ax' + by' + c \quad (I);$$

$$y = dx' + ey' + f \quad (II)$$

Accordingly, the relationship between both the coordinate systems can be obtained from calculating of the above-mentioned constants a, b, c, d, e and f by using corresponding actual coordinate values on six points. In the calculation, these six points are not necessarily to be lattice points (integral coordinate values).

Then, by using the above-mentioned formulas (I) end (II), for all the points of an image obtained after the transformation, corresponding points on the original image are obtained, and, color information on the points on the original image is used as color information of the points on the transformed image. However, as all the points on the original image may not be lattice points, desired color information should be obtained by using the color information of peripheral lattice points. In such a case, the above-mentioned three-order interpolation method is used for obtaining the desired color information by using the color information on the peripheral lattice points.

Accordingly, the same manner may be applied to the case of interpolating pixels in the white zone from pixels in the black/gray zones. Specifically, the pixels (1) through (16) in the black zone shown in FIG. 17 are assumed to be points G through V, and the pixel (17) in the white zone is assumed to be a point Z. Then, by using image data f(G) through f(V) on the 16 points G through V, the image data f(Z) on the pixel (17) is determined through interpolation (third-order interpolation), by using the following formulas (III) through (VI):

$$f(Z) = f(G)C(x_G - x_z)C(y_G - y_z) + f(H)C(x_H - x_z)C(y_H - y_z) + \ldots + f(V)C(x_V - x_z)C(y_V - y_z) \quad (III)$$

$$C(t) = 1 - 2t^2 + |t|^3, \text{ in case } 0 \leq |t| < 1 \quad (IV);$$

$$C(t) = 4 - 8|t| + 5t^2 - |t|^3, \text{ in case } 1 \leq |t| < 2 \quad (V);$$

$$C(t) = 0, \text{ in case } 2 \leq |t| \quad (VI)$$

There, C(t) represents an approximation formula of function sin πx/πx which expresses a sampling theorem, and the formulas (III) through (VI) are used for each component of R, G, B of color image data.

According to this method, as information of as many as 16 points is used, it is possible to provide a higher-quality image in comparison to a case of using the linear interpolation method.

At this time, in case m−x≧3 and n−y≧3 or 2x<m and 2y<n (see FIG. 14), a plurality of the above-described interpolation methods are selectively used. This is because, in such a case, it is necessary to select an appropriate one thereof according to the length of (m−x) and (n−y). For example, when the lengths of (m−x) and (n−y) are smaller (compression rate is smaller), the linear interpolation method (less finer interpolation method) may be applied for the white zone, while, when these lengths are larger (compression rate is larger), the three-order interpolation method (finer interpolation method) may be applied for the white zone. There, each of m, n, x and y represents the number of pixels. In the example of FIG. 14, n=5; m=5, x=2, and y=2. In this case, the gray zone (to which the nearest pixel method is applied as mentioned above) has the width of one pixel, as shown in the figure. This is because, as the image data of the gray zone is generated by using the black zone as it is according to the nearest pixel method, the image quality may be degraded if the gray zone has a wide area in comparison to the area of the black zone.

FIG. 18 illustrates an example of a basic interpolation pattern according to a sixth embodiment of the present invention. Similar to FIG. 14, 5×5 pixels are used as a unit of color image data, and, by decompression through interpolation, 5×5 pixels are generated from 2×2 pixels in a black zone. Then, for determining pixels other than the black zone, a plurality of interpolation methods are selectively used. In particular, in the example of FIG. 18, different from the above-described example shown in FIG. 14, the pixel having a distance β in a center-to-center basis from the pixel in the black zone which is longest among the distances α, β and γ is determined as a white pixel, and, the image data of the pixels in the gray zone are determined according to a first interpolation method while the image data of the pixel in the white zone is determine by a second interpolation method other than the first interpolation method.

Specifically, in a example shown in FIG. 19, the nearest pixel method is used for the gray zone, and the linear interpolation method is used for the white zone. Thus, the image data of the pixels in the white zone is determined as the image data of the pixels adjacent thereto respectively, as follow, as shown in the figure: (1)→(1); (5)→(5); (3)→(3); . . . . On the other hand, the image data on the pixels in the white zone is determined according to the linear interpolation method as follows: ((1)+(2))/2→(9); ((5)+(7))/2→(10); ((3)+(4))/2→(11); ((5)+(6))/2→(12); ((7)+(8))/2→(13); ((6)+(8))/2→(14); ((7)+3×(5))/4→(15); ((7)+2×(15))/3→(16); ((7)+(16))/2→(17); ((13)+3×(12))/4→(18); ((13)+2×(18))/3→(19); ((13)+(19))/2→(20).

Also at this time, in case m−x≧3 and n−y≧3 or 2x<m and 2y<n (see FIG. 18), a plurality of interpolation methods are used. This is because, in such a case, it is necessary to select an appropriate one thereof according to the length of (m−x) and (n−y). For example, when the lengths of (m−x) and (n−y) are smaller (compression rate is smaller), the linear interpolation method (less finer interpolation method) may be applied for the white zone, while, when these lengths are larger (compression rate is larger), the three-order interpolation method (finer interpolation method) may be applied for the white zone. There, each of m, n, x and y represents the number of pixels. In the example of FIG. 18, n=5; m=5, x=2, and y=2. In this case, the gray zone (to which the nearest pixel method is applied as mentioned above) has the width of one pixel, as shown in the figure. This is because, as the image data of the gray zone is generated by using the black zone as it is according to the nearest pixel method, the image quality may be degraded if the gray zone has a wider area in comparison to the area of the black zone.

FIG. 20 illustrates an example of a basic interpolation pattern according to a seventh embodiment of the present invention. Similar to FIG. 14, 5×5 pixels are used as a unit of color image data, and, by decompression through interpolation, 5×5 pixels are generated from 2×2 pixels in a black zone. Then, for determining pixels other than the black zone, a plurality of interpolation methods are selectively used. In particular, the pixels adjacent to the four sides of the black zone are determined as those in a gray zone, and, the image data of the pixels in the gray zone are determined according to a first interpolation method while the image data of the pixel in the white zone, other than the black zone and gray zone, is determine by a second interpolation method other than the first interpolation method. By employing this basic interpolation pattern, it is possible to maintain a high image quality particularly for non-edge image part.

Figures 21, 22, 23:
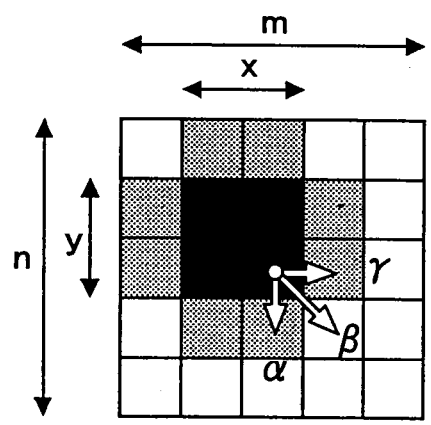
FIG. 21 illustrates a specific interpolation processing examples according to the seventh embodiment of the present invention.
FIG. 22 illustrates a basic image data interpolation pattern according to an eighth embodiment of the present invention.
FIG. 23 illustrates a specific interpolation processing examples according to the eighth embodiment of the present invention.

Specifically, in an example shown in FIG. 21, the nearest pixel method is used for the gray zone, and the linear interpolation method is used for the white zone. Thus, the image data of the pixels in the gray zone is determined as the image data of the pixels in the black zone adjacent thereto respectively, as follow, as shown in the figure: (1)→(1); (2)→(2); (4)→(4); (3)→(3); . . . . On the other hand, the image data on the pixels in the white zone is determined according to the linear interpolation method as follows: ((2)+(5))/2→(7); and ((4)+(6))/2→(8).

Also at this time, in case m−x≧3 and n−y≧3 or 2x<m and 2y<n (see FIG. 20), a plurality of interpolation methods are used. This is because, in such a case, it is necessary to select an appropriate one thereof according to the length of (m−x) and (n−y). For example, when the lengths of (m−x) and (n−y) are smaller (compression rate is smaller), the linear interpolation method (less finer interpolation method) may be applied for the white zone, while, when these lengths are larger (compression rate is larger), the three-order interpolation method (finer interpolation method) may be applied for the white zone. There, each of m, n, x and y represents the number of pixels. In the example of FIG. 20, n=5; m=5, x=2, and y=2. In this case, the gray zone (to which the nearest pixel method is applied as mentioned above) has the width of one pixel, as shown in the figure. This is because, as the image data of the gray zone is generated by using the black zone as it is according to the nearest pixel method, the image quality may be degraded if the gray zone has a large area in comparison to the area of the black zone.

FIG. 22 illustrates an example of a basic interpolation pattern according to an eighth embodiment of the present invention. Similar to FIG. 14, 5×5 pixels are used as a unit of color image data, and, by decompression through interpolation, 5×5 pixels are generated from 2×2 pixels in a black zone. Then, for determining pixels other than the black zone, a plurality of interpolation methods are selectively used. In particular, in the example of FIG. 22, similar to the above-described example shown in FIG. 18, the pixel having a distance β in a center-to-center basis from the pixel in the black zone which is longest among the distances α, β and γ is determined as a white pixel, and, the image data of the pixels in the gray zone are determined according to a first interpolation method while the image data of the pixel in the white zone is determine by a second interpolation method other than the first interpolation method. Also the scheme according to this basic interpolation pattern is advantageous for maintaining a high image quality for non-edge image parts.

Specifically, in a example shown in FIG. 23, the nearest pixel method is used for the gray zone, and the linear interpolation method is used for the white zone. Thus, the image data of the pixels in the gray zone is determined as the image data of the pixels adjacent thereto respectively, as follow, as shown in the figure: (1)→(1); (2)→(2); (4)→(4); (3)→(3); . . . . On the other hand, the image data on the pixels in the white zone is determined according to the linear interpolation method as follows: ((2)+(5))/2→(9); ((4)+(7))/

2→(10); ((5)+3×(2))/4→(11); ((5)+2×(11))/3→(12); ((5)+(12))/2→(13);((7) +3×(4))/4→(14); ((7)+2×(14))/3→(15); ((7)+(15))/2→(16).

Also at this time, in case m−x≧3 and n−y≧3 or 2x<m and 2y<n (see FIG. 22), a plurality of interpolation methods are used. This is because, in such a case, it is necessary to select an appropriate one thereof according to the length of (m−x) and (n−y). For example, when the lengths of (m−x) and (n−y) are smaller (compression rate is smaller), the linear interpolation method (less finer interpolation method) may be applied for the white zone, while, when these lengths are larger (compression rate is larger), the three-order interpolation method (finer interpolation method) may be applied for the white zone. There, each of m, n, x and y represents the number of pixels. In the example of FIG. 22, n=5; m=5, x=2, and y=2. In this case, the gray zone (to which the nearest pixel method is applied as mentioned above) has the width of one pixel, as shown in the figure. This is because, as the image data of the gray zone is generated by using the black zone as it is according to the nearest pixel method, the image quality may be degraded if the gray zone has a large area in comparison to the area of the black zone.

Figure 26:
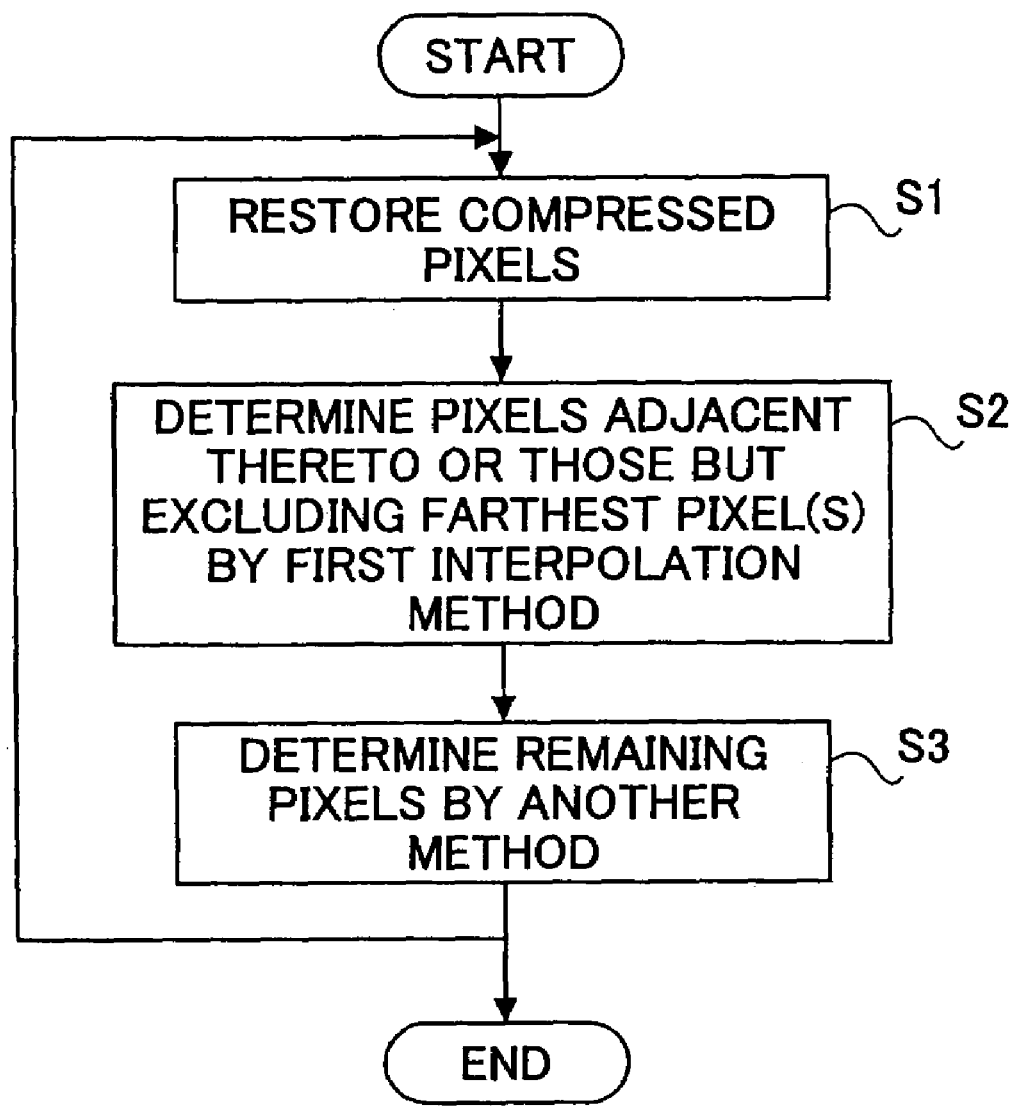
FIG. 26 illustrates processing described with reference to FIGS. 18 and 19.

FIG. 26 shows a flow chart of operation of the above-described image data interpolation method according to the fifth embodiment of the present invention. Assuming that 5×5 pixels are regarded as a unit, 2×2 pixels of compressed image data are decompressed and restored in a step S1. Then, the image data of pixels adjacent to these 2×2 pixels or those but excluding the farthest pixel(s) are determined through interpolation according to a first interpolation method (for example, the nearest pixel method) in a step S2. Then, the image data of the other pixels is determined through interpolation according to a second interpolation method other than the first interpolation method (for example, the linear interpolation method), in a step S3.

Figure 24:
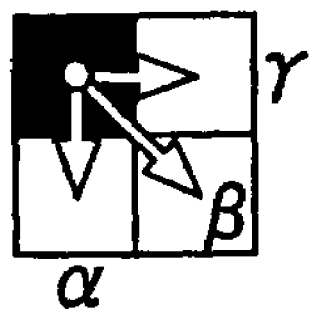
FIGS. 24 and 25 illustrate a case where image data is enlarged in size (the number of pixels) after decompression/interpolation is performed.
Figure 25:
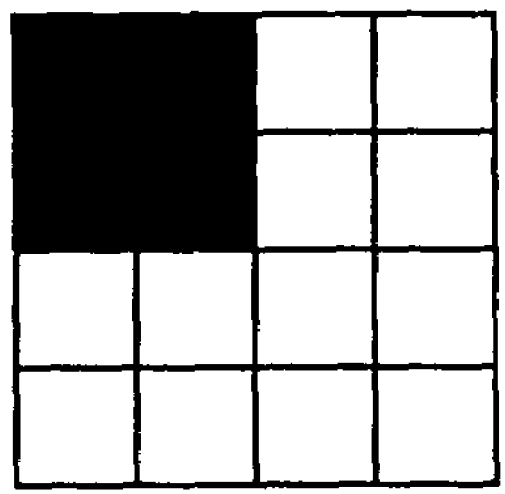

FIGS. 24 and 25 illustrate an example of image interpolation method according to a variant embodiment of any of the above-described fifth through eighth embodiments of the present invention in case a pixel group generated through interpolation will then undergo transformation processing, such as magnification (increase in the number of pixels) processing. In such a case, according to the size-change (change in the number of pixels) rate, an appropriate interpolation method is set.

In the example shown in FIG. 24, 2×2 pixels are regarded as a unit, and, the image data on pixels in a white zone is determined by interpolation. In this case, whether a single interpolation method is applied, or a plurality of interpolation methods are selectively applied is determined according to the size-change rate of pixel number change processing which will be performed on the thus generated pixels. For example, it is assumed that, a case is assumed where the change-change rate is 2, and, thus, as shown in FIG. 25, the original 2×2 pixels are transformed into 4×4 pixels.

Figure 27:
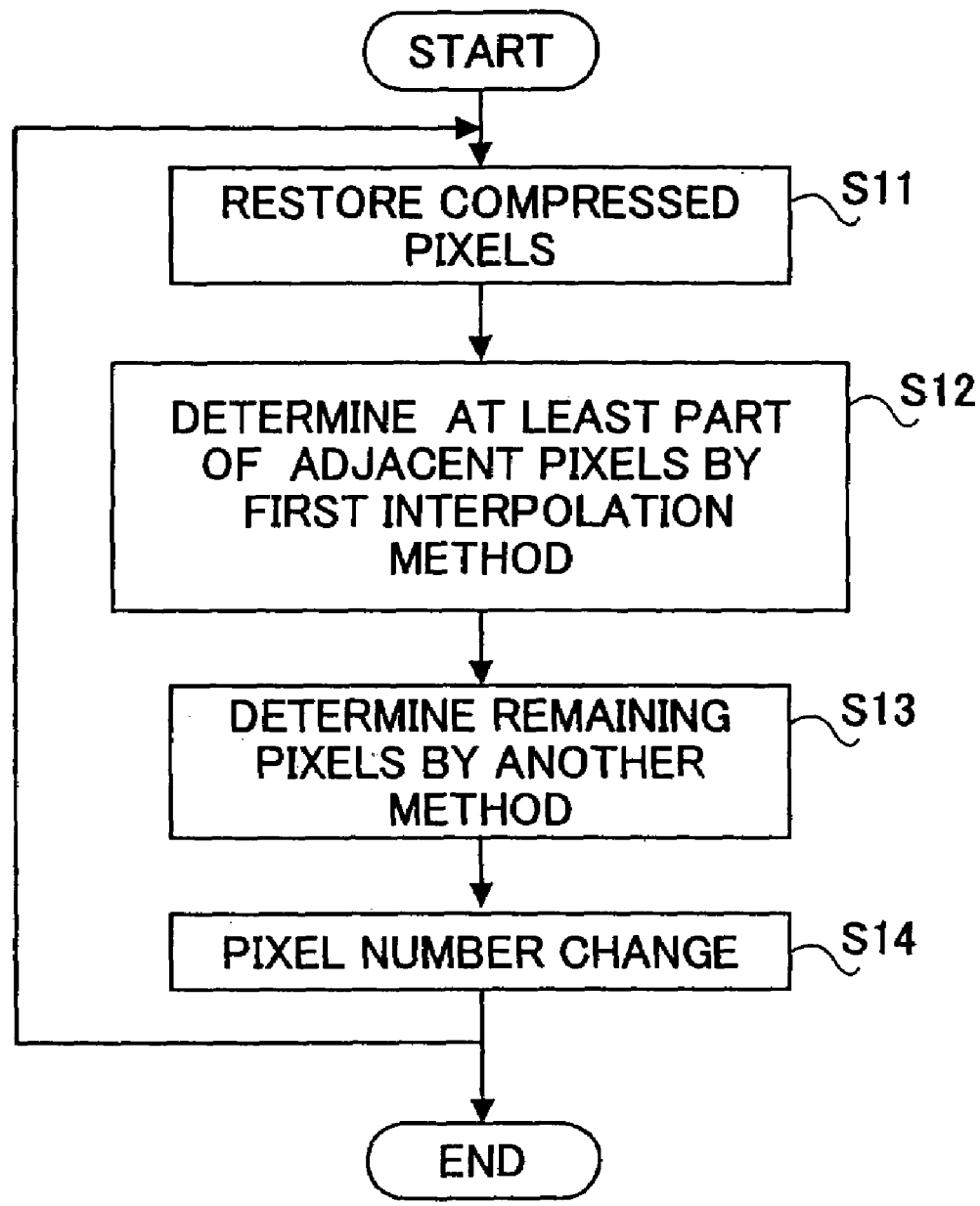
FIG. 27 illustrates processing described with reference to FIGS. 24 and 25.

FIG. 27 shows a flow chart illustrating the image data interpolation method according to the above-mentioned variant embodiment of the present invention applied to the above-described case wherein the size-change processing will be performed after the interpolation. In the figure, in a step S11, the compressed data of the 1×1 pixel shown in FIG. 24 is decompressed and restored. Then, the image data of at least part (only two pixels having the distances in a center-to-center basis from the 1×1 pixel shorter, i.e., α and γ, in the example of FIG. 24, for example) of the pixels adjacent to the 1×1 pixel (first zone or black zone) is determined according to a first interpolation method (for example, the nearest pixel method) in a step S12. Then, the image data of the remaining pixel(s) (the pixel having the distance in a center-to-center basis from the 1×1 pixel longer, i.e., β in the example of FIG. 24, for example) is determined according to a second interpolation method (for example, the linear interpolation method) other than the first interpolation method in a step S13. Then, processing of changing (increasing in the case shown in FIG. 25) the number of pixels is performed on the thus-obtained 2×2 pixels of image data, in a step S14.

FIGS. 28 through 35 show flow charts illustrating the above-described image data interpolation methods according to ninth through sixteenth embodiments of the present invention.

Figure 28:
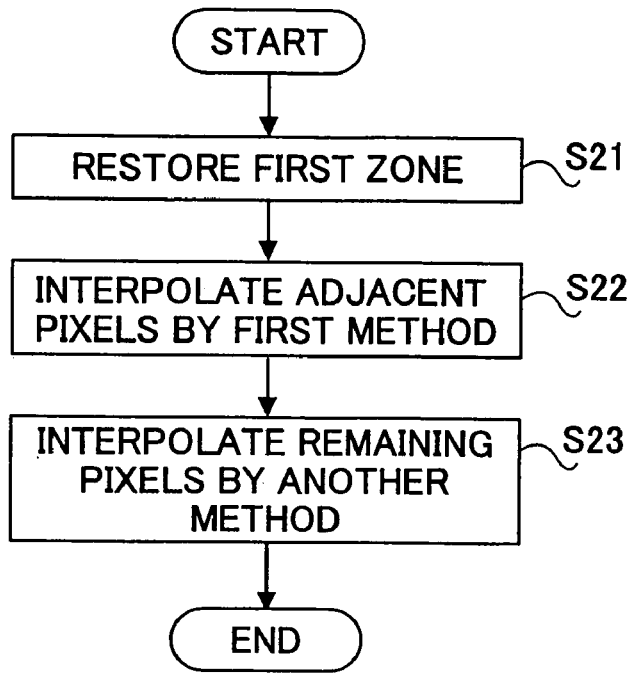
FIGS. 28 through 35 illustrate processing according to ninth through sixteenth embodiments of the present invention.

In FIG. 28, in a step S21, pixels in a first zone (black zone in the example of FIG. 16, for example) are restored by decompression. In a step S22, the image data on pixels (gray zone in the example of FIG. 16, for example) adjacent to the first zone is determined according to a first interpolation method (for example, the nearest pixel method). Then, in a step S23, the image data on the remaining pixels is determined according to a method (for example, the linear interpolation method) other than the first interpolation method).

Figure 29:
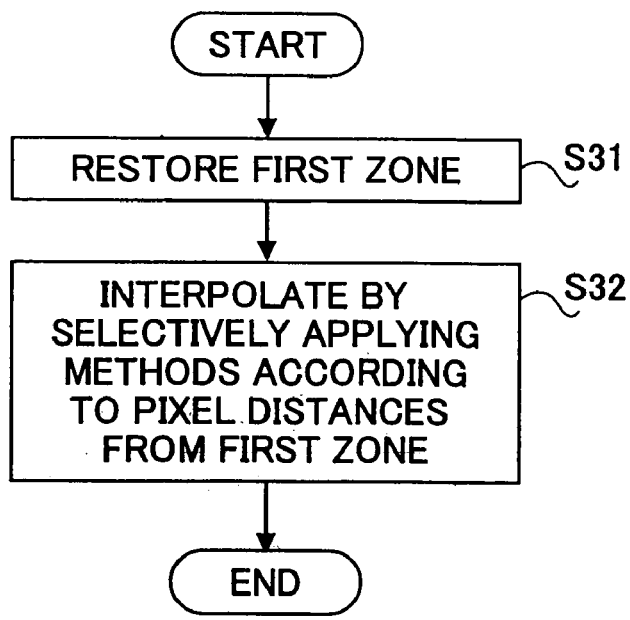

In FIG. 29, in a step S31, pixels in a first zone (black zone in the example of FIG. 19, for example) are restored by decompression. In a step S32, the image data on pixels is determined according to a plurality of interpolation methods selectively according to distances of the relevant pixels in center-to-center basis from the pixels in the first zone (for example, the nearest pixel method is applied to those nearest to the pixels in the first zone, the linear interpolation method is applied to those second nearest to the pixels in the first zone, and, then, the third-order interpolation method is applied to the remaining ones).

Figure 30:
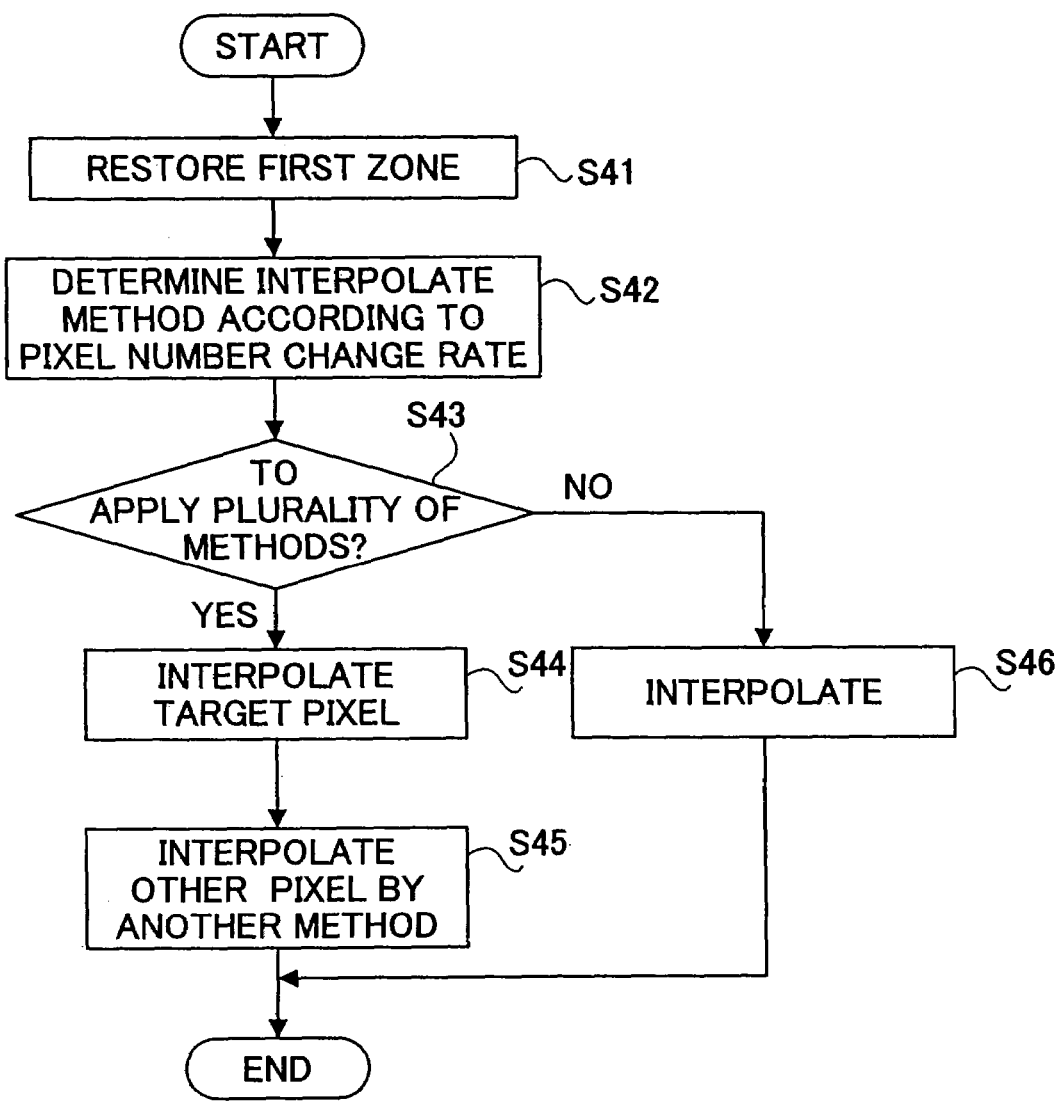

In FIG. 30, in a step S41, pixels in a first zone (black zone in the example of FIG. 16, for example) are restored by decompression. In a step S42, an interpolation method(s) to be applied is determined according to the size-change (change in the number of pixels) rate of pixel number changing processing to be performed later. Then, when it is determined in the step S42 that a plurality of interpolation methods are selectively applied, the image data of target pixels is determined according to a first interpolation method (for example, the nearest pixel method, i.e., in case of FIG. 14, for the gray zone) determined according to a predetermined condition (for example, the pixel-number change rate of pixel-number processing performed later, or the like, as mentioned above) in steps S43–S44, and, then, the image data on the remaining pixels is determined according to another method (for example, the linear interpolation method or three-order interpolation method for the white zone) in a step S45. When it is determined in the step s42 that a signal interpolation method is applied, the image data of the target pixels is determined only according to a single interpolation method (for example, the nearest pixel method, the linear interpolation method or three-order interpolation method described above) determined according to a predetermined condition (for example, the pixel-number change rate of pixel-number processing performed later, or the like, as mentioned above) in a step S46.

Figure 31:
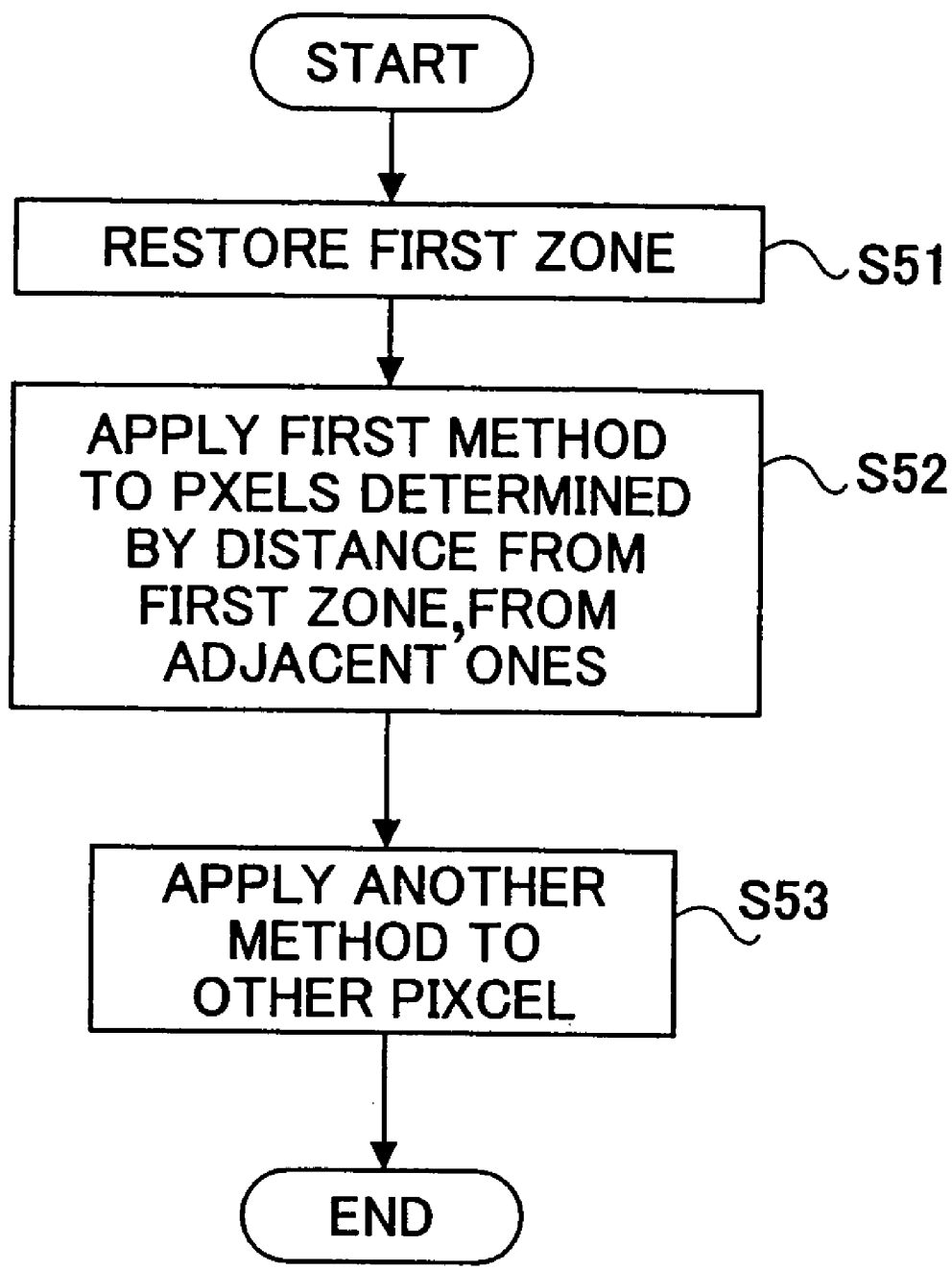

In FIG. 31, in a step S51, pixels in a first zone (black zone in the example of FIG. 19, for example) are restored by decompression. In a step S52, the image data on pixels (gray zone in the example of FIG. 16, for example) determined from the pixels adjacent to the first zone according to the pixel distances in center-to-center basis from the first zone is determined according to a first interpolation method (for example, the nearest pixel method). Then, in a step S53, the image data on the remaining pixels is determined according to a method (for example, the linear interpolation method or third-order interpolation method) other than the first interpolation method.

Figure 32:
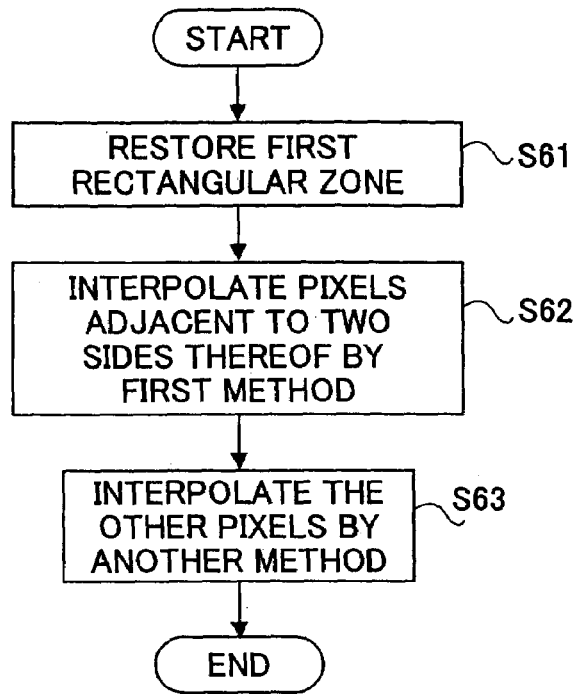

In FIG. 32, in a step S61, pixels in a first rectangular zone (black zone in the example of FIG. 14, for example) are restored by decompression. In a step S62, the image data on pixels (gray zone in the example of FIG. 14, for example) adjacent to two sides of the first rectangular zone is determined according to a first interpolation method (for example, the nearest pixel method). Then, in a step S63, the image data on the remaining pixels is determined according to a method (for example, the linear interpolation method or third-order interpolation method) other than the first interpolation method.

Figure 33:
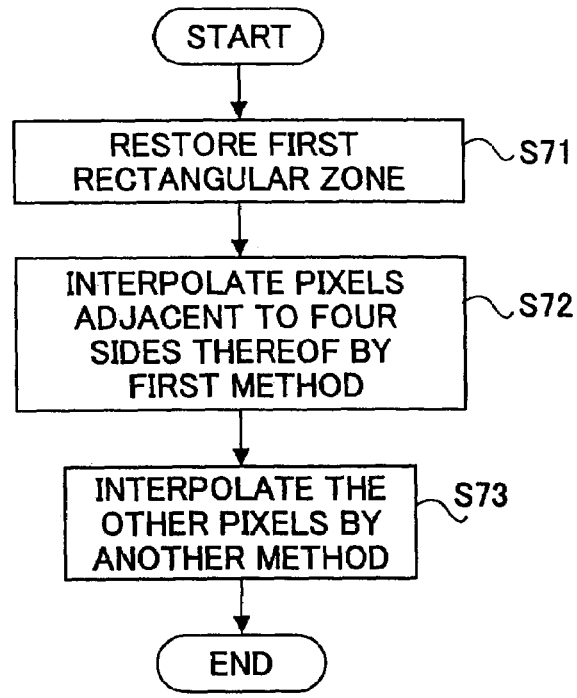

In FIG. 33, in a step S71, pixels in a first rectangular zone (black zone in the example of FIG. 20, for example) are restored by decompression. In a step S72, the image data on pixels (gray zone in the example of FIG. 20, for example) adjacent to the four sides of the first rectangular zone is determined according to a first interpolation method (for example, the nearest pixel method). Then, in a step S73, the image data on the remaining pixels is determined according to a method (for example, the linear interpolation method or third-order interpolation method) other than the first interpolation method.

In the above-described processes shown in FIGS. 32 and 33, assuming that the above-mentioned first zone is of a rectangle of x×y pixels (shown in FIG. 14, for example), a second zone is of a rectangle of m×n pixels (shown in FIG. 14, for example), preferably 2x<m and also 2y<n. Further, the above-mentioned first interpolation method is preferably applied to the gray zone having the width of not more than x/2 in the case of process shown in FIG. 32, and the above-mentioned first interpolation method is preferably applied to the gray zone having the width of not more than x in the case of process shown in FIG. 33. Further, in the process shown in FIG. 32, preferably, m−x≦3 and also n−y≦3.

Figure 34:
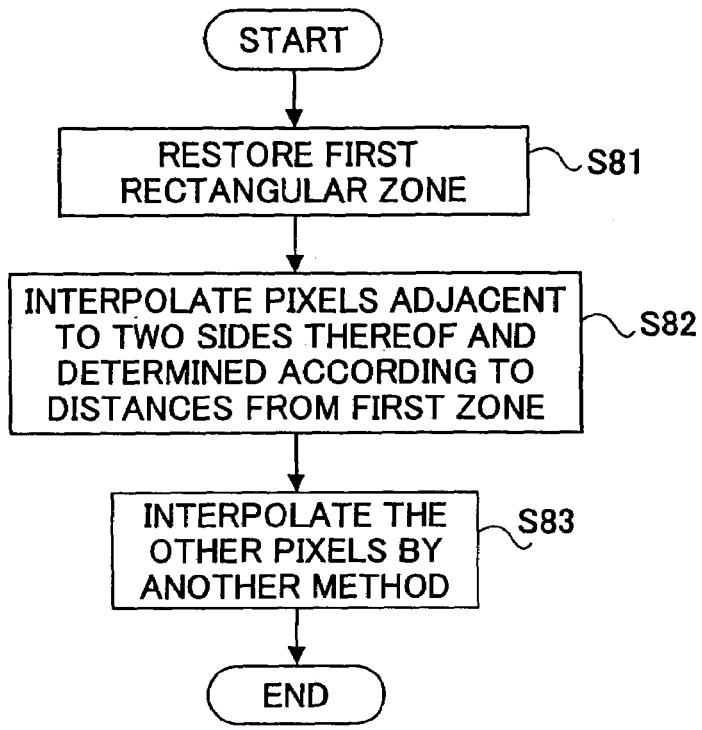

In FIG. 34, in a step S81, pixels in a first rectangular zone (black zone in the example of FIG. 18, for example) are restored by decompression. In a step S82, the image data on pixels (gray zone in the example of FIG. 18, for example) adjacent to two sides of the first rectangular zone and also determined according to the center-to-center-basis pixel distances from the pixels in the first rectangular zone is determined according to a first interpolation method (for example, the nearest pixel method). Then, in a step S83, the image data on the remaining pixels is determined according to a method (for example, the linear interpolation method or third-order interpolation method) other than the first interpolation method.

Figure 35:
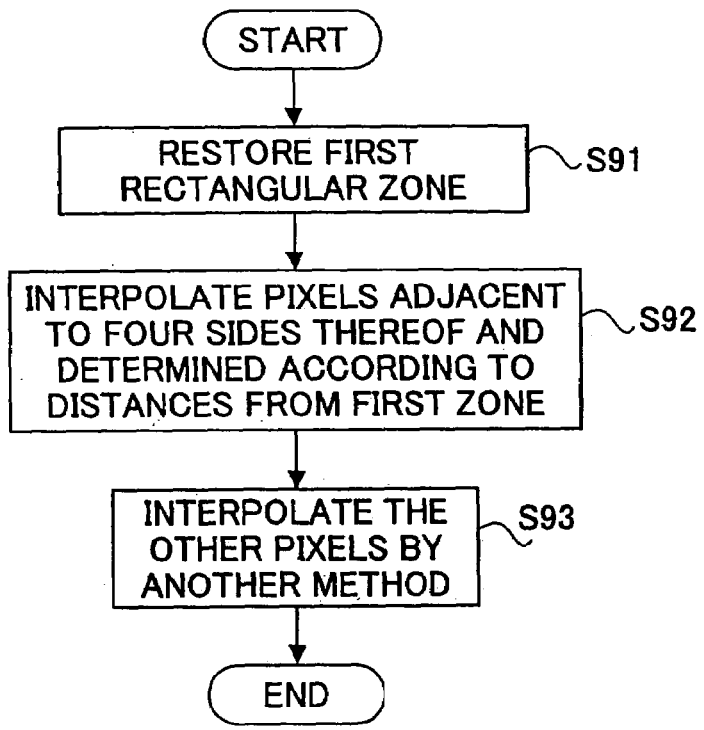

In FIG. 35, in a step S91, pixels in a first rectangular zone (black zone in the example of FIG. 22, for example) are restored by decompression. In a step S92, the image data on pixels (gray zone in the example of FIG. 22, for example) adjacent to the four sides of the first rectangular zone and also determined according to the center-to-center-basis pixel distances from the pixels in the first zone is determined according to a first interpolation method (for example, the nearest pixel method). Then, in a step S93, the image data on the remaining pixels is determined according to a method (for example, the linear interpolation method or third-order interpolation method) other than the first interpolation method.

The present invention may also be realized by using an information recording medium such as a CD-ROM, a magneto-optical disk, a DVD-ROM, a floppy disk, a flash memory, or any other medium such as various type of ROM, RAM, or the like in which software programs for causing a general-purpose computer or the like to perform any of the above-described image compressing/thinning-out, image decompression/interpolation processing schemes according to the above-described embodiments of the present invention. In such a case, the above-mentioned information recording medium is loaded into a general-purpose computer or the like, which then reads the software programs therefrom, writes them into a memory thereof, again reads out the programs therefrom in appropriate timing so as to appropriately execute the relevant processing schemes.

Further, the present invention is not limited to the above-described embodiments, and variations and modifications may be made without departing from the scope of the present invention.

The present application is based on Japanese priority applications Nos. 2000-396434 and 2001-91594, filed on Dec. 27, 2000 and Mar. 28, 2001, respectively, the entire contents of which are hereby incorporated by reference.

What is claimed is:

1. An image processing apparatus carrying out thinning out on image data in block units, and decompressing the thus-generated compressed image, comprising:
   a correcting part interpolating the compressed image according to a nearest method with the use of image data of pixels adjacent to a short side of a block of the compressed image, compressed in block units;
   a determining part determining whether or not pixel density conversion is to be carried out on the decompressed image; and
   a first comparing part comparing the conversion rate of the pixel density conversion with a predetermined first threshold, when said determining part determines that the pixel density conversion is carried out, wherein:
   when the conversion rate exceeds the first threshold in the first comparing part, the compressed image is interpolated not according to the nearest method but according to a linear interpolation method.

2. The image processing apparatus as claimed in claim 1, further comprising:
   a second comparing part comparing the conversion rate with a second threshold when the conversion rate exceeds the first threshold in the first comparing part, wherein:
   when the conversion rate is larger than the second threshold in said second comparing part, the compressed image is interpolated neither according to the nearest method nor according to the linear interpolation method, but according to a method using a three-dimensional formula.

3. A storage medium containing a program for execution by a processor, said program when executed by the processor causing the processor to perform the acts of:
   carrying out thinning out on image data in block units, and decompressing the thus-generated compressed image, comprising the steps of:
      interpolating the compressed image according to a nearest method with the use of image data of pixels adjacent to a short side of a block of the compressed image, compressed in block units;

determining whether or not pixel density conversion is to be carried out on the decompressed image; and comparing the conversion rate of the pixel density conversion with a predetermined first threshold, when said determining step determines that the pixel density conversion is carried out, wherein:

when the conversion rate exceeds the first threshold, the compressed image is interpolated not according to the nearest method but according to a linear interpolation method.

4. The storage medium as claimed in claim 3, wherein the decompressing further comprises:

comparing the conversion rate with a second threshold when the conversion rate exceeds the first threshold, wherein:

when the conversion rate is larger than the second threshold, the compressed image is interpolated neither according to the nearest method nor according to the linear interpolation method, but according to a method using a three-dimensional formula.

* * * * *